United States Patent [19]

Kasparian et al.

[11] Patent Number: 4,896,370

[45] Date of Patent: Jan. 23, 1990

[54] CONTROL SYSTEM FOR MICROPROCESSOR AND SOFTWARE ENHANCED COMMUNICATIONS EQUIPMENT

[75] Inventors: Kaspar A. Kasparian, Raleigh; Aaron S. Rogers, Knightsdale, both of N.C.

[73] Assignee: Teletec Corporation, Raleigh, N.C.

[21] Appl. No.: 31,004

[22] Filed: Mar. 27, 1987

[51] Int. Cl.⁴ .............................................. H04B 1/40
[52] U.S. Cl. ....................................... 455/77; 455/89; 455/347; 340/789; 340/811; 379/59
[58] Field of Search ....... 455/77 R, 154, 89, 156–159, 455/347, 53, 54, 218, 221; 340/789, 802, 805, 811; 379/59, 63

[56] References Cited

U.S. PATENT DOCUMENTS

| | | | |
|---|---|---|---|
| 4,232,390 | 11/1980 | McEvilly, Jr. | 455/77 |
| 4,291,412 | 9/1981 | Imazeki | 455/154 |
| 4,486,624 | 12/1984 | Puhl et al. | 370/24 |
| 4,654,655 | 3/1987 | Kowalski | 455/78 X |
| 4,670,747 | 6/1987 | Borras et al. | 455/73 X |
| 4,718,080 | 1/1988 | Serrano et al. | 379/59 |

OTHER PUBLICATIONS

"Omni Transceiver and IQ1000 Control Unit" Brochure by Teletec Corp. 1987.
Unider Transceiver Microprocessor Controlled Channel Mobile Radio, Photo.
Shinwa Transceiver UHF/FM, VHF/FM Mobile Radio Telephone, Photo.
Kenwood Transceiver, Photo.

*Primary Examiner*—Thomas H. Tarcza
*Assistant Examiner*—John B. Sotomayor
*Attorney, Agent, or Firm*—Breneman & Georges

[57] ABSTRACT

A control system for microprocessor and software enhanced land mobile radio communications systems is provided to increase versatility, capabilities and facilities while providing an easier and more precise control of various radio protocols. As the usage of microprocessors and software is increased in radio communications equipment, additional capabilities, digital protocols and versatility can be desired in such equipment. However, this requires additional and special controls and prior art approaches have limitations with respect to capacity, versatility, size and compatibility with digital protocols. The innovative approach of the invention provides a compact new system to replace prior art multipositional knobs and switches and refines the system of control. The novel control system provides for an efficient utilization of space while achieving outstanding versatility and new operational and control capabilities. This is achieved by advantageously accommodating microprocessors and software based radios by utilizing a multifunctional keypad in combination with a display and command/mode and control switches to access and control a large number of versatile and combined capabilities, operating modes and facilities in a compact form.

40 Claims, 12 Drawing Sheets

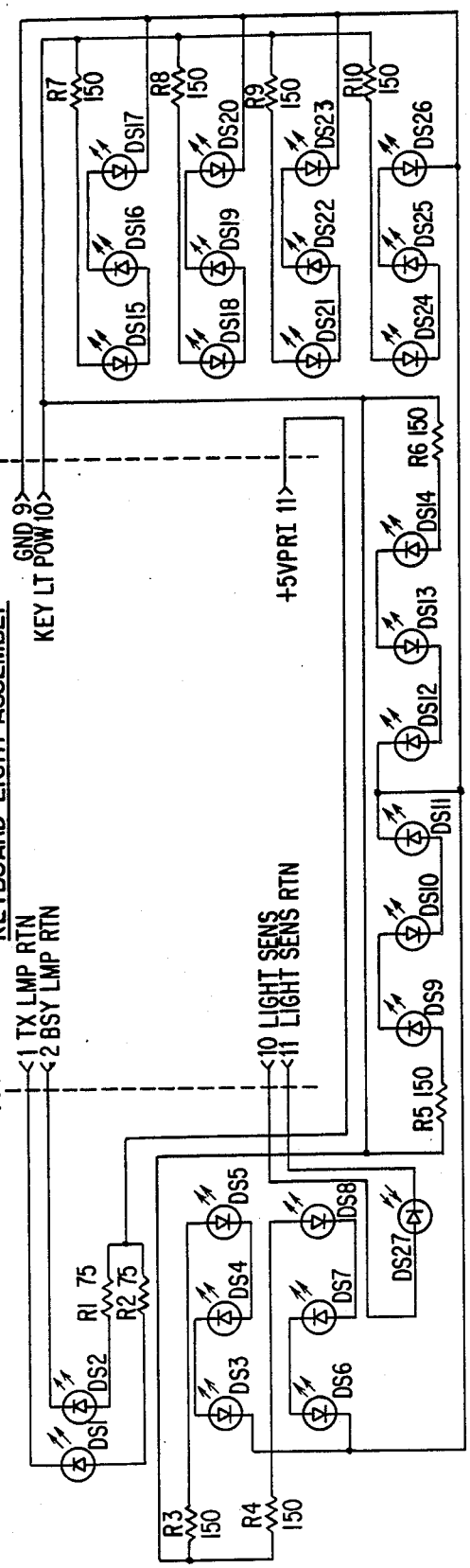
Fig.6a KEYBOARD LIGHT ASSEMBLY
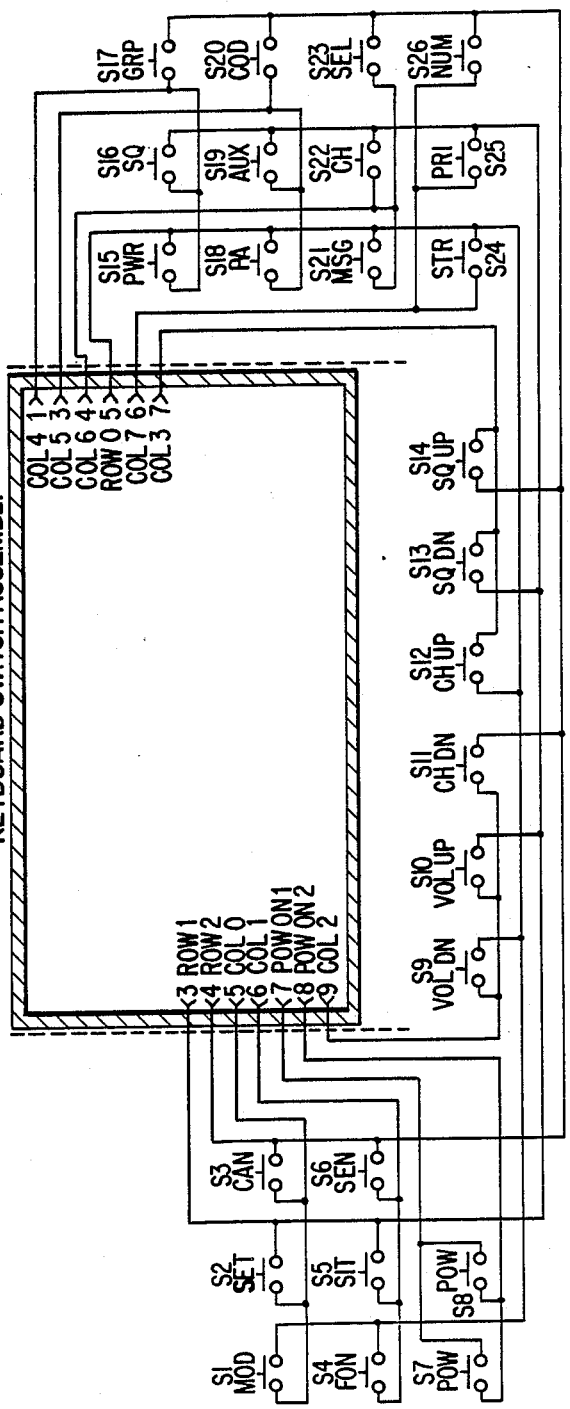
Fig.6b KEYBOARD SWITCH ASSEMBLY 4,896,370

CONTROL SYSTEM FOR MICROPROCESSOR AND SOFTWARE ENHANCED COMMUNICATIONS EQUIPMENT

BACKGROUND OF THE INVENTION

CROSS REFERENCE TO RELATED APPLICATIONS

The invention pertains to a novel control system for microprocessor and software enhanced communications equipment that is interrelated to the subject matter of the following related copending patent application (1) U.S. application Ser. No. 031,005, entitled Control Panel Or Similar Article; (2) U.S. application Ser. No. 030,743, entitle, Computerized Multistandard, Field-Convertible, MultiRegional/ MultiService, Remote Controllable, Remote Programmable Mobile Two-Way Radio System With Digital Serial Bus Link, Built-In Programmer And Autodiagnostics; (3) U.S. application Ser. No. 031,003, entitled Bidirectional Digital Serial Interface For Communication Digital Signals Including Digitized Audio Between Microprocessor-Based Control And Transceiver Units Of Two-Way Radio Communications Equipment; (4) U.S. application Ser. No. 030,594, entitled Audio Blanking Fill-In Method And Apparatus For Priority Multi-Channel Receivers; (5) U.S. application Ser. No. 030,499, entitled Variable Time Inversion Algorithm Controlled System For Multi-Level Speech Security; and (6) U.S. application Ser. No. 030,592 now U.S. Pat. No. 4,739,288 issued Apr. 19, 1988, entitled Combined Phase And Frequency Modular For Modulating An Information Signal, all of which applications were filed on Mar. 27, 1987 the disclosures of which are incorporated herein by reference.

FIELD OF THE INVENTION

The present invention pertains to a control panel and system for the operation and control of radio communications equipment. More particularly, the invention is applicable to land mobile radio communications equipment by the combination of a keypad having multifunctional control switches with command switches, a mode switch, other function control switches and a display to more efficiently access functions to provide versatility, to control the selected function more precisely and in a digital format, to save space and to replace the numerous knobs and switches heretofore employed in land mobile radio communications equipment. The combination of multifunctional control switches bearing reference control modes in association with a keypad bearing reference values which control or value is accessed through one or more command switches along with a display for identification facilitates the selection of the function and the control and the value of the function. The combination of command switches with multifunction control switches, a multifunctional display and a value keypad provide a sophisticated control system having extended capabilities, facilities, functions and versatility requiring only limited space. The limited space required by the command and control switches along with their versatility allows room for a sophisticated display that can take advantage of sophisticated software and computer assisted indicators and prompts while allowing the identification and control of a variety of functions providing operational and programming related information and selected or retrieved values.

DESCRIPTION OF THE PRIOR ART

The prior art is embodied in a diversity of land mobile radio communications equipment utilizing a number of individual multipositional knobs and multicontact switches with a resulting limited versatility of functions and operating modes. Such multipositional knobs and multicontact switches require a lot of space and only control a limited number of operational functions. Prior art land mobile communication systems employing such multipositional knobs and switches are rudimentary in their capabilities and have little versatility in comparison with the control system provided in accordance with the invention. As a result, such prior art communications systems operating on VHF, UHF and SHF frequency bands are limited in their functions and optimal add on capabilities because of the necessity for a large number of multipositional control knobs and selective position switches required to select and control various functions.

The prior art multipositional knobs and switch combinations are not multifunctional and are not satisfactorily compatible with or derive full advantage of microprocessor enhanced or programmable software based communications equipment. The prior art multipositional knobs in switches limit the versatility and the operation of the radio to selecting and varying within limits functions such as digital status messages and digitally stepping the squelch level. In contrast, the control system of the present invention expands the capabilities and versatility to allow operator communication with the microprocessor in the radio for programming and extending the capabilities of the communications equipment constructed in accordance with the invention as will be discussed hereinafter in greater detail.

The most relevant known prior art is U.S. Pat. No. 4,232,390 which utilizes a combination of a transmitter frequency keyboard selector and a receiver frequency select keyboard as a control means for a land mobile radio. U.S. Pat. No. 4,232,390, in contrast to the present invention, employs a multipositional volume switch and the keyboard is not multifunctional so as to provide the versatility or a compact form, which with a display, allows user interaction with the telecommunications equipment.

Another form of prior art includes a microprocessor controlled radio telephone transceiver as provided in U.S. Pat. No. 4,486,624 which utilizes a standard keypad and display for dialing telephone numbers in a cellular type radio telephone system. While the keypad is similar and a display is provided, the microprocessor controlled radio transceiver of U.S. Pat. No. 4,486,624 is basically intended for telephone and not a multifunctional multipurpose radio transceiver having a digital selection and control of various functions. It is rather designed to operate within a fixed predetermined network with standard proscribed cellular system parameters. The keyboard and keypad in U.S. Pat. No. 4,486,624 are not specially designed to set various control modes, recall value functions, set value functions through the multifunctional keypad and allow the access and operator interaction with microprocessor and software as is accomplished in accordance with the present invention.

In U.S. Des. No. 260,770 a combined vehicular radio receiver and telephone dialing pad is illustrated. This dialing pad similarly does not utilize the multiple keypad function of the present invention and does not teach or suggest either the multifunctional control system or the accessing or the setting of various modes.

Such prior art radios in part as a result of their unsophisticated control systems have provided limited versatility and capabilities that have heretofore resulted in police and emergency vehicles having to use many different control schemes to cover different networks and requirements and depending upon the level of sophistication of the use and the application. Generally the more sophisticated the radio equipment the greater the number and variety of the control knobs, switches and displays. Typical prior art simpler applications have entailed the use of radios with one or few channels typically accessed by rotary dials combined with various knobs and switches each of which control volume, squelch, channel selection and possibly the operation of the manual selection of channels or through channel scanning.

More complex applications may require radios to operate over wide geographic areas with multiple coverage zones and may involve a number of services being coordinated in the same network. A nationwide public safety network is one example. In such a network, the public safety communications system could extend over multiple regions, each requiring its respective group of frequencies. Such a network is typically similar to a military command and control system in many respects. It usually involves the full communications coordination of multiple branches of the public safety agencies, different headquarters, together with other communications users such as the National Guard, Military, Emergency Medical Services, Fire Departments, etc. From the foregoing, it can easily be recognized that radio equipment intended for more complex applications will inherently require more complex controls and versatility.

Furthermore, most end-users always insist on compactness and ease of use. Many times, consultants designing such networks place future versatility demands on the equipment in anticipation of planned future changes in operational requirements or in the network. Equipment designed for such sophisticated users are termed as 'High-End Products' for differentiation purposes. In the past, the design of such equipment has typically been undertaken on a one by one, custom basis, this was necessary to meet the individual idiosyncrasies of the different networks. Each such custom designed system for a multiple-service, multiple-region, sophisticated network would typically be only suitable for that particular system. Such customizing almost always would require multiple special controls to such an extend that very little room remained for practical sized control units for the future versatility or for incorporating provisions to allow the same control unit to meet other requirements in other networks. This placed severe limitations on the extent of future versatility provisions and the reuse of the custom designed control systems.

Currently, the advent of increasingly powerful and versatile microprocessors and memory devices at lowered costs is prompting two-way radio designers to incorporate such devices in a new generation of equipment. Many of the capabilities and facilities required in systems using High-End radio products can now be provided through software and digital techniques.

The combination of multiple-service, multiple-region capabilities into a single radio combined with one or more microprocessors and software to enhance versatility and provide additional capabilities to the radio has required a new approach to a control system. The increased controls required to utilize the microprocessor increased capabilities and facilities have been accomodated while eliminating the bulky and inadequate control systems of the prior art. The present control system allows access and communication between the radio operator and the microprocessors in the radio and its software to provide versatility and added capabilities to the novel radio.

The invention replaces the multiple and conventional bulky and limited multipositional knobs. Conventional control knobs such as those use for channel selection require more space and are more difficult to use as the number of positions required on the control knob is increased. It is easier to use a three position selector knob than a one hundred position selector knob. Furthermore, the one hundred position selector knob will require a greater space in the panel and also is more difficult to accommodate in terms of space and layout. The invention, by the utilization of a keypad having one or more command buttons or switches on the panel to access a function in combination with multifunctional control buttons or switches to change values of the accessed function, has eliminated the cumbersome multipositional knobs required in the prior art. The novel keypad furthermore takes advantage of the microprocessor enhanced capabilities to provide operator access to sophisticated software based protocols in the radio.

These advantages are provided in accordance with the invention by the utilization of an extremely compact and versatile control system that provides room for a display to confirm selected modes, functions, values and prompt-required security or programming information from the operator. The advantages of the invention include the application of multifunctional control buttons or switches in combination with a keypad along with command buttons or switches and a display to access and identify selected values and functions. The enhanced versatility and capabilities as a result of the control system allow full advantage be realized from sophisticated microprocessors and software to achieve advantages in the control of the radio and the ability to allow the radio to be programmed and changed from one network to another in field service and use.

SUMMARY OF THE INVENTION

The limitations and disadvantages of prior art standard and customized land mobile radio communications equipment and the limitations in operating and controlling existing two-way radios are obviated by the present multifunctional standardized control system which eliminates the requirement for multipositional knobs, switches and other space consuming selectors and devices that cannot take full advantage of the capabilities provided by microprocessors and software of modern two-way radios. The present control system provided access to many facilities and capabilities provided by microprocessors and allows their combination in a single radio that can access existing and customized networks. The novel control system also reduces the space required for the controls so that a display can be included to display software-based programs and provide access to additional functions and capabilities not heretofore available.

The present invention is the product of an extensive research investigation into a ergonomic system for the rearrangement, reorganization and reduction in the complexity of existing controls. The result has been the creation of a versatile and very compact system in which a standardized keypad is utilized in conjunction with multifunctional control switches having control, value and preset memory capabilities in various modes that are accessed through one or more command switches and positively identified in an accompanying display. The result has been a reduction in the complexity of operation and increased versatility in land mobile radio communications equipment to provide a new generation of microprocessor based two-way radio equipment. The novel control system allows the utilization of a multitude of operational, control and programming capabilities in radio communications equipment arranged in a novel, advantageous, simple and compact form. This reduction translates into single system that accommodates all standard and existing custom made systems by a single control unit.

The compactness and versatility imparted as a result of the present control system allows a sophisticated radio to fit into the compact space provide in standard openings provided for radios in the dashboard of European, American and Japanese cars. The control features of the invention are designed to fit in the smallest opening and are adaptable to larger openings while making all the controls available to the user in the smallest practical space.

The requirement of employing a finite number of controls for accessing a large multiple of functions and controlling the value of those functions for purposes of saving space must be compatible with the requirement of simple operating protocols along with a display for identifying channel, functions or value information and the operating mode of the radio. This is advantageously achieved in accordance with the invention by the utilization of a display in combination with a familiar keypad similar to those employed in push button telephone sets along with multifunctional control buttons or switches disposed on the keypad. The keypad and display cooperate with one or more command buttons or switches to provide access and subsequent resetting of the values or stati of various control modes. In the preferred embodiment of the invention, in application to land mobile radio communication equipment, the control switches can be used in many distinct ways such as for example:

(1) Selecting functions.
(2) Setting the status of the function.
(3) Setting relative value of the functions.
(4) On/off latching requirements.
(5) Dialing telephone or destination numbers.
(6) Programming.
(7) Verifying settings.
(8) Modifying or providing other control functions through button combinations.
(9) Function to function referral ("go-to").
(10) Invoking cycling of different responses when a key is given successive depressions within a predetermined amount of time.
(11) Providing a response only after the keys are depressed for a predetermined amount of time.
(12) Providing momentary nonlatching on/off controls.
(13) Invoking a critical operation only after the key is pressed twice or more times in a predetermined period of time which would then produce a request for ascertaining the requested critical control and then producing a critical response after again pressing the button a multiple number of predetermined times.
(14) Cancelling or reverting a function set.
(15) Requesting access, identification or other codes.
(16) Varying operating modes in succession or cycle.

In the preferred embodiment of the invention a keypad is disposed on the right side of the radio housing with the keypad having numbers arranged in the familiar '1' to '2' configuration including '#' and asterisk '*' symbols with associated multifunctional control switches as normally found on a DTMF AT&T telephone keyboard. The keypad control switches corresponding to the '1' values may also include one or more control functions to allow each of the keypad switches to be used for many different functions.

On the left side of the radio housing one or more command buttons or switches are provided for purposes of changing the operating modes or providing distinct operating configurations for the communication equipment. For example, one or more command SET switches can be employed to access one or more sets of functions and thereafter be used to reset the status or value of these functions through the use of the multifunctional keypad control switches. In addition, a command cancel switch can be used to cancel a selected on-off function. A further command switch such as a MOD switch can be used to change or cycle the operating mode of the land mobile transceiver as follow: manual mode, manual with priority mode, scan mode, priority scan mode and then back to manual mode.

A display panel may be conveniently provided between the keypad including keypad control switches and the command switches or other suitable location. The display panel not only provides a display of the function selected but also the status of value of the function being set or previously preset or programmed into the Transceiver. In the preferred embodiment of the invention, additional control switches that are repeatedly utilized to effect changes are added outside the keypad portion of the control panel. These include a paired set of volume, channel and squelch switches. These switches can be conveniently located under the display to change the up/down functions for the operation and for programming requirements of the novel transceiver. In the preferred embodiment, the paired up/down channel switches are used to provide access to a particular channel in either an up or down manner or a slewing fashion (slow then fast) both for normal operator use and for programming purposes. In the programming the up/down channel selector switches can be used to look up the desired frequency or frequencies by accessing up or down or through a table of frequencies a particular frequency or set of frequencies stored in the memory that can be displayed for the programmer. Similarly the squelch switch and volume switch can be employed respectively to modify the squelch and volume in relation to a predetermined standard that can be shown on the display or other programming requirements.

In the preferred application of the invention, depressing a combination of control switches can be employed to provide access to other functions such as software programming modes that are not accessed when each control switch is used alone. For example, pressing a combination of switches can shift the equipment into a special operating mode. These combinations and their control of various functions will be discussed in the detailed description of the invention. These and other advantages and features of the invention will become more apparent with reference to the appended drawings which illustrate a preferred embodiment of the invention. The novel features of the invention eliminate the number and complexity of multipositional switches of the prior art and provide a confirmatory display system for displaying functions selected, programmed information and values or programmed prompted date which will be discussed in greater detail in the detailed description of the invention.

DESCRIPTION OF THE DRAWINGS

Other advantages and features of the invention will become apparent to those skilled in the art from the following detailed description of the invention in conjunction with the accompanying drawings in which:

FIG. 6 illustrates the Front Panel Subassembly of the keyboard control system;

DETAILED DESCRIPTION OF THE INVENTION

Figure 1:
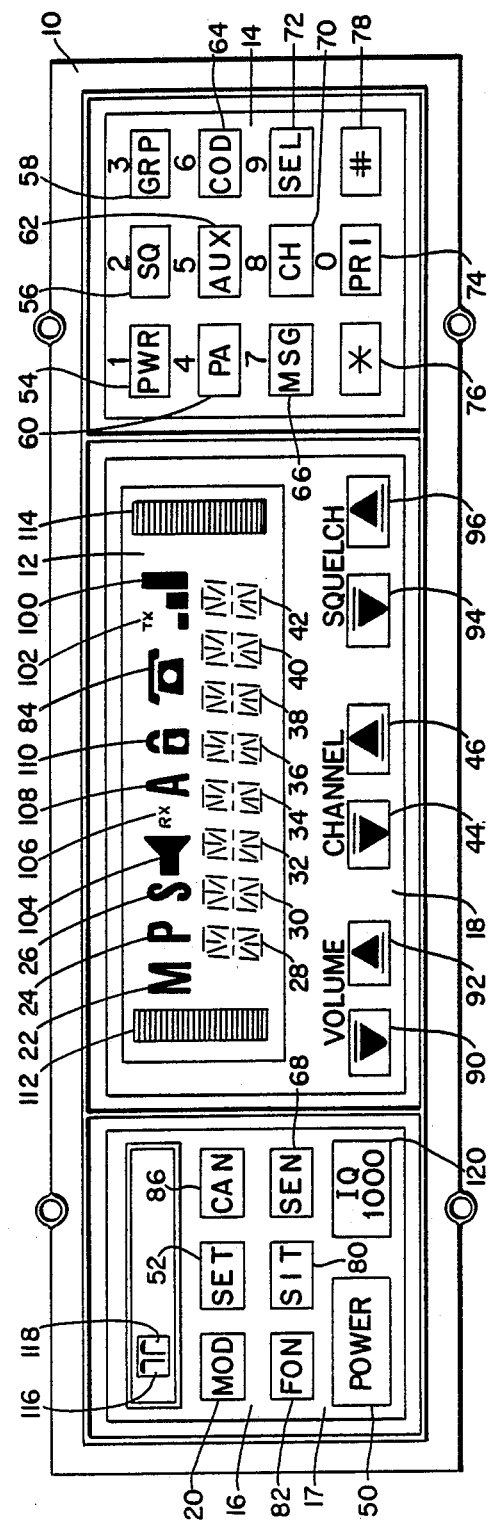
FIG. 1 is a front elevational view of a control panel for a two-way radio having a keypad and associated control switches, command switches and display constructed in accordance with a preferred embodiment of the invention.

Referring now to FIG. 1, a control system for microprocessor enhanced radio communications equipment is illustrated in accordance with the invention in which the prior art control knobs and multipositional switches have been eliminated and replaced by multifunctional control buttons or switches that have been designed for multi-purpose use. In FIG. 1 the control system for a two-way radio is housed in a compact housing 10 having an alphanumeric up or down scrolling display screen 12, a keypad 14, a command panel 16 and control area 17 with an additional control center 18 located below display screen 12. The multifunctional control switches disposed in keypad 14 along with the control switches in control area 17 and control center 18 may all serve multifunctional purposes when activated or accessed through a command switch in panel 16 to provide a more precise control and take advantage of extensive microprocessor capabilities. The combination of multifunctional control switches with command switches allows the replacement of a multitude of the prior art single function multipositional switches, knobs and controls.

The keypad 14 is advantageously utilized in combination with command and control switches or buttons to provide a multitude of operating protocols. In the preferred embodiment of the invention in land mobile radios the keypad 14 along with the command and control switches are used in many different and distinct ways, such as: (1) for selecting functions, (2) for setting the status of the functions, (3) for setting relative values of the functions, (4) for 'on-off' latching requirements, (5) for dialing telephone or destination numbers, (6) for programming, (7) for verifying settings, (8) for affecting other functions through button combinations, (9) for function referral ('go-to'), (10) for invoking cycling different responses when given key is successively depressed within a predetermined time, (11) for providing a response only after keys are depressed for a predetermined time, (12) for providing momentary, non-latching on-off controls, (13) for invoking a critical operation only after a key is pressed twice or more times in a predetermined time, which produces a request for ascertaining the requested critical control and then producing the critical response after again pressing the button a multiple number of predetermined times, (14) for cancelling or reverting a function set (15) for requesting access, identification and other codes and (16) varying operating modes in succession or cycle.

The command panel 16 includes one or more command switches which in FIG. 1 includes MOD or mode switch 20, a SET or set switch 50 and CAN or cancel switch 86. The command switches are used to change, set or cancel functions and operating modes. The command switches in combination with control switches in the keypad 14 can be used to set or change any value from zero to infinity in a manner as will be hereinafter described.

The MOD switch 20 is used to control and vary the operating mode of radio communications equipment constructed in accordance with the invention which in the preferred embodiment is land mobile radio communications equipment. The display screen 12 confirms the selected mode by displaying the mode in a segmented and color coordinated display on the display screen.

Figure 5:
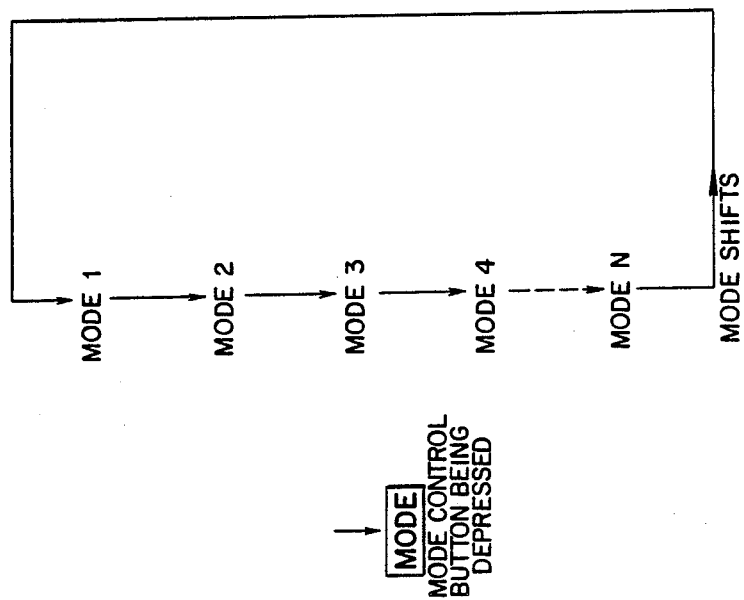
FIG. 5 illustrates the multifunctional control attributes of the mode switch and its sequential cycling operation.

The MOD switch 20 is a multifunctional command switch having a number of modes which are represented on display screen 12 as M at position 22, standing for the manual mode, or MP at positions 22 and 24 standing for the manual with priority mode, or the S at position 26 standing for the scan mode, or PS at positions 24 and 26 standing for priority scan. The MOD switch 20 in the preferred embodiment is used to change the operating mode of the land mobile transceiver in a cycle as illustrated in FIG. 5. The depression of the MOD switch 20 causes a mode shift and cycles the modes from mode 1, which may be the manual mode and which produces a M display at 22, to mode 2 in FIG. 5, which may be the manual with priority mode resulting in an MP display at 22 and 24 and then to mode 3 the scan mode resulting in a S display on 26 to mode 4, a priority scan mode resulting in a PS display at both 24 and 26. In this manner it is possible to add any number of additional automatic or predetermined modes which may be programmed into the software of the control system as represented by mode N in FIG. 5. Upon completion of the cycling of the modes the mode shift returns to mode 1 as illustrated in FIG. 5.

The activation of the power control switch 50 results in the illumination of the display screen 12. In the preferred embodiment of the invention, the power switch 50 is designed to require a timed depression before activating the off function of the novel transceiver. This timed depression can prevent inadvertent turning off of the transceiver caused by the accidental touching of the power switch.

The microprocessor enhanced control system imparts important versatility to the two-way radio. The two-way radio can be programmed with software to provide many variations. For example, the two-way radio can have a manual operating mode with a priority override to result in a MP indication at symbol annunciator positions 22 and 24. In this mode, channel selection is manual however one or more priority channels are also being monitored for incoming signals which when active will result in the radio automatically switching to the priority channel and displaying the channel number in position 32 to 42 over the manually selected channel.

The MOD switch 20 can also be utilized to access the Scan Mode resulting in the illumination of an S at position 26 signifying the scanning of predetermined channels within a given group for incoming signals. A subsequent activation of the MOD switch 20 can shift the operating mode to Priority Scan resulting in a display of PS in positions 24 and 26. In this mode the receiver will scan all programmed channels within a given group but will provide priority to special channels that have been designated as priority channels. As indicated in FIG. 5 further depression of the MOD switch 20 can include other modes for the radio before a mode shift back to mode 1 with a corresponding display.

The command SET switch 52 is designed to provide access to the multifunctional control switches in keypad 14 or in control panel 17 followed by the accessing of the 1 to 0 values represented on keypad 14. The control switches associated with the keypad 14 are not only located in keypad 14 but also can be located in other areas of the Control Unit such as in control panel 17. The multifunctional control switches disposed in keypad 14 include PWR switch 54 representing RF Output Power which also serves as the number 1 in value settings in segmented displays in positions 28 through 42 for various accessed functions. Control SQ switch 56 disposed in keypad 14 adjacent to the number 2 in keypad 14 represents a squelch control switch for digitally setting the squelch level and maintaining a particular squelch setting in the radio. Control SQ switch 56 also represents the digit 2 on the keypad when switch 56 is in the value mode. As a result, squelch, like volume, can be digitally set with numbers appearing in segment displays 28-42 with relative levels also being shown in segmented display 100.

In operation, the squelch level as well as other control functions can be verified or reset. Verification of a predetermined control setting such as squelch level is achieved by merely pressing the corresponding control switch. For example, verification of the squelch setting could be made by depressing SQ switch which would result in the digital display of the squelch level in one or more of the positions 28-42.

Resetting of any control value or status in the preferred application of the invention first requires the activation of a command switch such as command switch 52. In one way to reset the squelch level, the command SET switch is depressed followed by SQ switch 56 to access the squelch control which then causes the display to confirm that the squelch function has been selected. The previous squelch level may then be reset by depressing switches in keypad 14 corresponding to a number, for example from 1 to 32 or any other number, to digitally control the level of squelch. In this manner, the command SET switch followed by control SQ switch 56 followed by the depressing of switches in the keypad which further correspond now to values on the keypad is used to change and control value levels and replace a conventional variable knob with 32 or more positions. Squelch control SQ switch 56 also corresponds to the number 2 on the DTMF type keypad and allows the number 2 to be programmed in one of the positions 28 through 42 in the display.

The GRP switch 58 represents the group of channels that can be selected in the novel transceiver. In addition, the GRP switch 58 in its multifunctional control also represents the number 3 in keypad 14. Similarly, the PA switch 60 represents a public address access switch allowing microphone audio or incoming messages to be broadcast through a built in or associated emergency vehicle public address system. In addition, the PA switch 60 also serves as a number 4 for setting values of different functions and displaying the numerical value in one or more of the positions 28-42 in display panel 12.

AUX switch 62 represents an auxiliary access and is utilized among other things to alert the operator when outside the vehicle of an incoming message or telephone call. The AUX switch 62 also serves to set the value of different functions and to display the number 5 in one or more of the positions 28 to 42. The COD switch 64 represents the code button and provides a position for future additional functions which may be programmed into the memory system of the microprocessor. For example, activation of SET switch 52 followed by activation of COD switch 64 plus entering an operator identification number may provide headquarters with information as to the operator's security clearance identification. The COD switch 64 also serves to set the value of different functions and to display the number 6 in one or more of the positions 28 to 42 in display screen 12. In voice secure applications it may be used to select specific predetermined codes.

Figure 2:
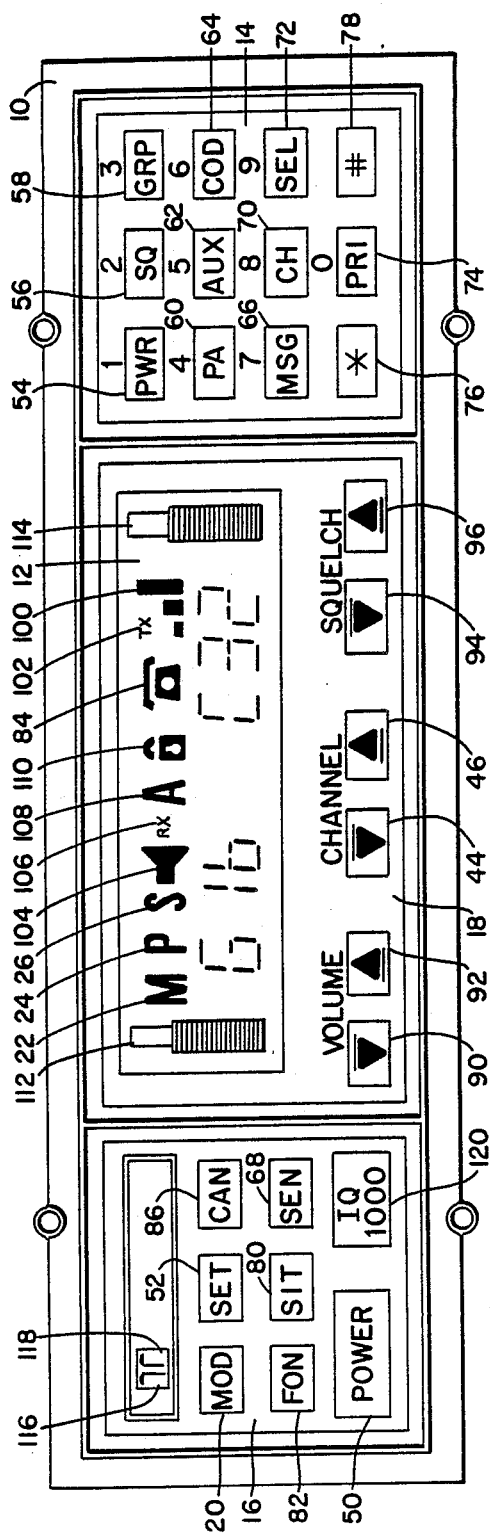
FIG. 2 is a front elevational view of the control panel arrangement of a two-way radio similar to FIG. 1 with an alternative embodiment of the novel keypad and illustrating a display of information.

The MSG switch 66 provides access to messages and allows up to 99 messages or more to be sent to headquarters. MSG switch 66 also serves to set the value of different functions and display the number 7 on display screen at one or more positions 28 to 42. CH switch 70 represents the channel selection switch and allows the operator to set the radio for any one of preprogrammed channels in a group by dialing the numbers in the multifunctional control switches in the keypad 14. For example, a depression of command SET switch 52 followed by CH switch 70 followed by a depression of switches 58 and 56 results in the selection and display of CH 32 as illustrated in FIG. 2 representing the selection of channel 32. Similarly CH switch 70 serves its multifunctional aspect by setting and displaying the value for the number 8 in one or more of the display positions 28 to 42.

The SEL switch 72 represents the selective call switch which allows one vehicle utilizing the novel transceiver to selectively call one or more specific vehicles in a fleet of up to 999 or more vehicles also utilizing the novel transceiver. The control accessing a particular vehicle or group of vehicles through SET switch 52 followed by SEL switch 72 in combination with the keypad multifunctional control switches is of great assistance to police and law enforcement agencies by screening out unspecific communications and allowing the unfettered communication between one or more police Vehicles. The SEL switch 72 also serves its multifunctional aspect by setting and displaying the value for the number 9 which is confirmed on display screen 12 in one or more of the positions 28 to 42.

PRI switch 74 represents a speech or data privacy function to provide access to private communications at one or more security levels through a prior art or custom encryption system. Activation of SET switch 52 followed by PRI switch 74 accesses the privacy function, the level of which can be set through the multifunctional keypad. The PRI switch 74 also serves its multifunctional purpose by setting and displaying '0's and the representatives tens, hundreds, thousands etc. value in display positions 28 to 42.

The asterisk switch 76 and the pound switch 78 can be employed for the control of the on/off override of the automatic light control system for the illumination the controls and display. These switches can also be utilized during programming for various requirements such as 'enter' and 'save'.

In addition to the various control switches in keypad 14, there are other control switches providing other functions which can be accessed after depressing SET switch 52. SEN switch 68 activates the send function for the novel transceiver, transmitting the identification and status of the vehicle concerned. SIT switch 80 allows the operator to access a particular repeater site through a predetermined tone scheme so that the novel transceiver can also utilize special and specific mutiregional or other communications sites. This imparts added versatility to the radio and ensures that the radio is not limited to use un one location or rendered useless as soon as the location of the vehicle is moved from one local access network to another. This combination allows the unit to be usefully deployed where chases or special operations are across state lines or across multiple regions. To access a specific site, SET switch 52 is depressed, followed by SIT switch 80 followed by a number dialed with the multifunctional keypad.

The accessing of command SET switch 52 in combination with FON switch 82 provides an access to the telephone network and illuminates an annunciator in display screen 12 at position 84 to indicates the access of the standard telephone network. The accessing of the telephone system not only displays the telephone but also allows the switches in keypad 14 to now function as an ordinary telephone keyboard.

In addition to the command switches previously discussed, the command CAN switch 86 can be used for various command functions such as providing for the cancellation of settings. The command CAN switch can also be used to delete erroneous entries during the programming of the novel radio transceiver.

It is apparent from the foregoing that the present control system unlike the prior art control system provides access to a wide range of functions and other parameters that can be set or programmed by the operator in the field. In the prior art systems, most parameters are programmed at the factory whereas in the radio communication systems constructed in accordance with the invention these functions are set or programmable by the operator in the field.

Microprocessor enhanced land mobile communications equipment constructed in accordance with the invention is capable of cloning stored information, channels and frequencies to other radios within that particular system. These advantages and functions are assisted by the multifunctional controls and novel keypad in combination with microprocessor and command buttons.

The novel control system can also employ paired channel control selector switches 44 and 46 of which switch 44 may be used for sequentially decreasing or going down the channel frequencies and switch 46 may be used for sequentially going up or increasing the channel frequencies. The novel control system may also include paired volume switches such as switch 90 for decreasing volume and switch 92 for increasing volume. The novel transceiver may similarly include a pair of squelch switches such as switch 4 for sequentially decreasing squelch level and a switch 96 for sequentially increasing squelch level.

The advantages in the replacement of the multipositional knobs and switches of the prior art with multifunctional switches and confirmatory display panel will be further illustrated in a discussion of the operation of a two-way radio. In operation, command SET switch 52 is depressed to change the value of a particular function by next depressing the control switch corresponding to that function followed by control switches in keypad 14 corresponding to the desired new value or status. For example, the operator could depress SET switch 52 followed by SQ switch 56 followed by dialing a number on the same keypad to set the squelch level in digital steps, either up or down and then have a digital number assigned to that squelch level displayed on display screen 12 in positions of 28–42.

Other control functions can be similarly accessed. For example, depressing SET switch 52 in combination with CH switch 70, followed by the activation of switches in keypad 14 corresponding to the desired channel number results in the selection of a specific channel and the display of the channel number in the positions 36–42.

The accessing of the control SIT switch 80 through command SET switch 52 selects the CTCSS tones or other access coding for selecting a specific station located at a certain site. In addition, for security purposes, the operator may be prompted or required to enter a code number or numbers through keypad 14 to identify the user or select/operate peripheral internal accessories and options or to select a specific code related to the system. In this manner, the operator can access a particular repeater in the same network or a repeater in a different network.

The depression of SET switch 52 followed by PWR switch 54 sets the R.F. output level of the transceiver in relative steps. For example, depression of SET switch 52 plus PWR switch 54 plus depressing PWR switch a second time would set the R.F. output power at its lowest predetermined level. Similarly, depressing SET switch 52 followed by PWR switch 54 followed by switch 56 would set the power at the next higher predetermined level. The display screen 12 at position 100 along with the TX symbol at position 102 visually displays the level of the power setting. In FIG. 1, the three vertical bars of different height are used with the TX designation to indicate low, medium and high power settings.

The depressing of SET switch 52 followed by PA switch 60 activates the public address system that may be integral with or external to the novel transceiver. For example, depressing switch 52 followed by PA switch 60 and then switch 56 which now represents a 2 could be used to route the microphone sound into the public address system. The versatility of the novel transceiver in its wide range of adaptability is apparent from the numerous functions provided in each of the various modes for example, activation of SET switch 52 followed by PA switch 60 followed by switch 54 could be used to route a received audio signal into the public address system.

The compactness and multifunctional aspects of the novel control system provided by the command switches in combination with the combined control and value switches in keypad 14 in combination with display screen 12 can be used in a variety of formats such as, for example, the activation of SET switch 52 followed by PA switch 60 followed by a keypad value such as that provided by GRP switch 3 or PA switch 4 etc. to access other public address sources such as different siren sounds.

The activation of the public address system results in the display of the public address speaker annunciator symbol in position 104 on display screen 12 to visually confirm the activation of the public address system. The speaker symbol at position 104 confirms the selection of the public address system for amplifying information ingoing or outcoming from the radio. The symbol speaker can be augmented by additional symbols such as the RX symbol at position 106 signifying that the received audio is now being routed to the public address system to visually identify the particular type of function selected.

The activation of SET switch 52 followed by AUX switch 62 followed by a number dialed on the keypad activates external auxiliary signaling devices that are typically used to alert the operator of an incoming message or call when he is outside of the vehicle. Thus, the activation of SET switch 52 and then switch 62 followed by a keypad value switch, i.e., 1, 2, etc. can be utilized to activate the horn, where 1 represents the horn, where 2 represents the siren, or other required device to alert the operator. When SET switch 52 is depressed followed by AUX switch 62 the display screen 12 displays the symbol A at position 108 to indicate the activation of the auxiliary signaling system.

The activation of the SET switch 52 followed by the FON switch 82 results in the display of a telephone annunciator symbol at position 84 and activates the telephone protocol allowing the switches in the keypad 14 to be used for dialing destination telephone numbers.

The activation of SET switch 52 followed by CAN switch 86 provides a means for canceling various functions. To cancel on/off or other set functions the operator would press CAN switch 86 followed by the function switch corresponding to the function to be cancelled, for example, to cancel the phone protocol CAN switch 86 followed by FON switch 82 would result in the cancellation of the telephone protocol.

The activation of the SET switch 52 followed by PRI switch 74 accesses the switches in keypad 14 for the selection of the level of security employed. As soon as the SET switch 52 is activated followed by PRI switch 74 followed by the entry of the level of encryption (if multiple levels of encryption are used) display screen 12 displays a security symbol such as a padlock in the position 110 to indicate the activation of the security system. The display screen 12 can then be used to prompt the requirements for entering the COD or code number for a particular level of security required. This in turn could require the activation of SET switch 52 plus COD switch 64 plus the dialing of the code number on the keypad 14 in order to provide access to the specific security code to be employed in the communication. This type of operation employs a "Go-To" protocol, i.e. after setting security level, the prompting produces a 'Go-To' invitation to set the code number in that level.

Depressing a number of switches simultaneously can be used to activate the program mode and prompt the entry of an access security code before allowing an operator to program the novel transceiver. Unless the access security code is properly supplied to the keypad 14, reprogramming of the novel transceiver would not be allowed. In this mode, the switches can be used in different ways to select the Items being programmed and set their numerical values or status.

Figure 3:
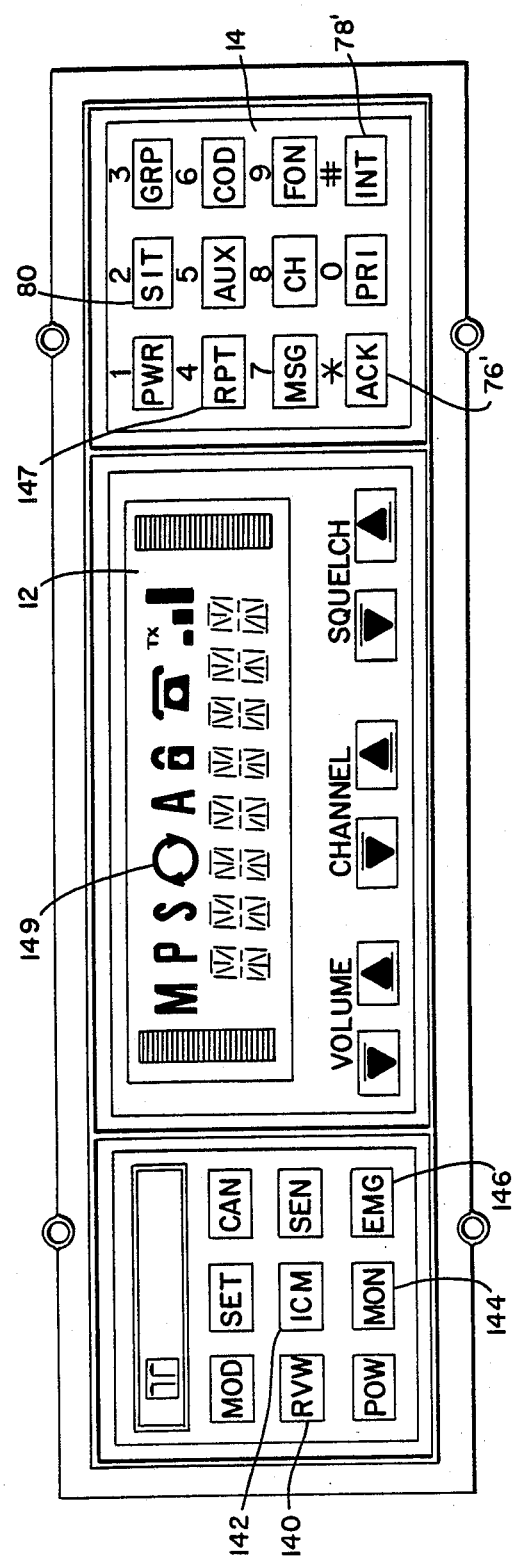
FIG. 3 is a front elevational view of and alternative embodiment of the novel control unit for a fixed station embodiment of the invention.

The software can be designed to produce user-friendly prompting for values, levels or status of the item being programmed, or provide "tables" to select from. A scrolling alphanumeric display such as shown in FIG. 3 in display screen 12 could utilize positions 28 through 42 for programming. In the programming mode, the asterisk and pound symbols on the keyboard can be used for various programming requirements such as for 'enter' and 'save' requirements. The CAN 86 switch can be used to cause successive deleting of entered items to provide corrections. The up/down channel, volume and squelch control switches can also be used in the program mode for various requirements. In other embodiments of the invention, other combinations of switches or key sequences can be used to revert the transceiver back to its operating mode after programming.

In normal operation, the down volume switch 90 and up volume switch 92 are used to raise and lower the audio level. Similarly the down squelch switch 94 and up squelch switch 96 are used to adjust the squelch. Both volume and squelch adjustments are displayed on display screen 12 in digital steps for a predetermined period of time prior to reverting of the display to indicating the group and channel number or other alphanumeric representations of same. The display screen 12 also confirms the analog/relative setting of these controls through respective bar graph indicators 112 for volume and 114 for squelch on display screen 12. The down channel 44 and the up channel switch 46 in the preferred embodiment are employed for providing quick access to the up/down selection of channels in a slewing fashion, i.e., slow at first and the after each time the channel switch 44 and 46 are depressed.

The spaces 116 and 118 next to the T logo in the preferred embodiment are used to provide a visual indication of whether the transmitter is in operation or whether there is a channel busy status. A red light in space 116 indicates the transmitter is in operation while a flashing yellow light in space 118 indicates that the channel is busy. The SEN switch 68 represents the sending function for the radio so that each time it is depressed there is an automatic identification of the source or vehicle from which the transmission has been sent together with its status.

In the preferred application of the invention, the area 120 surrounding the IQ switch employs a light sensor to automatically dim or increase the background lighting of the display screen 12 along with the intensity of the background lighting of all the control, keypad and command switches. A combination of switches such as the asterisk and pound switches may be used to control on/off overrides or to control the intensity of the automatic lights of the panel of the control system. The preferred application as illustrated in FIG. 1 employs a special negative contrast LCD with a translucent bright filter to provide optimum day/night viewing.

As seen from the foregoing, a vast number of control capabilities and a precise digital control is provided through the combination of command, control and keypad switches in combination with a digital display to confirm the selection and the value of various functions selected. These control capabilities have in accordance with the present invention been accommodated in an extremely compact and useful form to provide enormous versatility to communications systems constructed in accordance with the invention. For example, the SEL switch 72 can be used for the selective calling of other stations. In a sequential tone scheme using multiple tones, as many as 999 or even 999,999 specific addresses may be accessed by simply depressing the SET switch 52 followed by SEL switch 72 plus the number of the station or group being selected. The simplicity of using the system of the present invention in comparison to using a 999,999 position rotary switch selector demonstrates the compactness and advantages of the invention over the prior art.

As a result of the special and multifunction design of the control system, the invention is designed to take full advantage of microprocessor enhanced control systems that are increasingly being used in communications equipment. The versatility of the present invention further accomodates present customized systems and is adaptable to accept future systems and changing operational requirements as they develop.

The invention takes full advantage of software capabilities and microprocessor based radios and can accept other functions or the complete or partial rearrangement of those functions. Even secondary functions can be incorporated by using a second SET (or other named) switch with a special color coding or other identification to access secondary functions on the control switches as will be further discussed with respect to FIG. 4. Similarly, tertiary and even further functions may be provided for in radios constructed in accordance with the invention. All functions, values, stati and protocols can be allowed or inhibited through software. Similarly, button response may be customized through software control.

Referring now to FIG. 3, a preferred embodiment of the control system for fixed or base station applications constructed in accordance with the invention is illustrated in which additional functions and switches have been added along with the enlargement of the control system. All of the functions and switches illustrated in FIG. 3 corresponding to the functions and switches in FIGS. 1 and 2 have been numbered with similar numbers. Those switches bearing the same identification letters as heretofore discussed with respect to FIGS. 1 and 2 provide essentially the same type of control but their arrangement has been changed in the fixed station embodiment.

In the fixed station application of the invention, the keypad 14 may be used to directly dial numbers to provide selective calling to mobile or portable equipment in the network without first requiring the depression of the command SET switch. The value and function data on keypad 14 may be arranged in a number of different ways such as in FIGS. 1 and 2 or other equivalent arrangements. In the mobile embodiment, as illustrated in FIGS. 1 and 2, the SET switch 52 must be used first. The reason for this difference is that mobile use of selective calling is much less frequent than for headquarters. As a result, it is undesirable in mobile applications to provide selective calling by simply direct dialing access numbers because of the possibility of inadvertent actuation by the operator in dialing selective call access numbers and disturbing the network by inadvertent switch activation. However, in the fixed station application, the operator is generally experienced through continuously calling vehicles, portable radios or other communication groups and, as a result, is more adept and careful. In addition, eliminating the SET switch command for selective calls by the fixed station operator saves time through reducing two steps on the calling protocol.

The RVW switch 140 has been added to the fixed station embodiment as shown in FIG. 3 to provide confirmation for different settings in the radio. This confirmation is produced by depressing the RVW switch followed by a function switch. For example, depressing switch 140 followed by SIT switch 80 which has been rearranged to the keypad 14 side of the panel will result in the display screen 12 identifying the particular repeater site that the operator at the fixed base is communicating through. In the mobile embodiment, a review of the setting is accomplished by simply depressing the desired control switch as has heretofore been discussed. The settings in the mobile embodiment require the depressing of the SET switch first before the settings can be changed to prevent accidental calls and changed settings through fumbling or because of jarring while the vehicle is in motion.

The intercom or ICM switch 142 allows the operator to access intercom communications between station operators. The ICM switch may also be used to provide an intercom control facility between the operator's position and the remote site where the transceiver is situated. In addition, the ICM switch can be utilized with the SET switch 52 or with other switches to provide additional functions as has been previously discussed with respect to the keypad switches.

The MON switch 144 is used to provide a monitoring of channels with a deactivation of the squelch. The emergency switch EMG 146 provides a special alert tone indicating that an emergency message is being received. These switches, namely the ICM switch 142, MON switch 144 and EMG switch 146 were added to produce a momentary nonlatching control function as long as they are depressed. Being similarly momentary in action, they are grouped in a cluster.

The CAN 86 switch in the land based transceiver is used for an additional setting in the fixed base embodiment in contrast to the mobile embodiment. The cancel switch 86 in a land based station as shown in FIG. 3 is used to produce default level settings. This may be required in special situations when a new operator takes over the control position with the start of a new shift. Under these circumstances, the operator would depress the CAN switch 86 twice within a predetermined time to make certain a particular command was not accidental. The verification could be through a display with a statement such as 'DFTLVL ?' (default level?) on display screen 12. If the CAN switch is accidentally pressed twice the operator does not need to do anything at this point and the display will revert to indicating the channel number or other previous status within a predetermined time. If, on the other hand, the operator really requires that all settings are to revert to a predetermined default setting, he would press the switch twice again and the default settings would be produced and confirmed on the display.

The keypad 14 in FIG. 3 is slightly different than the keypad 14 in FIG. 1 in that the asterisk switch 76 has been replaced by an ACK switch 76' and the pound switch 78 has been replaced by the INT switch 78'. The asterisk and pound symbols have correspondingly been moved to the keypad 14 where their secondary functions remain the same as in the mobile embodiment.

The ACK switch 76' produces the acknowledge function when it is depressed for the first time. ACK appears on the display 12 in the positions 22, 24 and 26 as well as on the display of the caller being acknowledged. This protocol provides an acknowledgement to a calling mobile operator that the mobile's status message has been received by the fixed station. Depressing the ACK switch 76' a second time within a predetermined time produces the RTV or retrieve function. The retrieve function allows the fixed station operator to retrieve the next call. Thus, successively depressing the ACK switch 76' will produce a cycle of acknowledging messages and retrieving the next message. This provides an advantageous means for the operator to easily handle a heavy traffic of the incoming status calls from a large fleet.

The INT switch 78' has similarly been used to cycle between the INT interrogate and message reset (RST) functions. The interrogate function is used to produce an automatic transponding of the identification and status of a called mobile. The reset function is used to reset messages from headquarters or a fixed station to the mobile. This dual cycling function is also designed to provide the operator of a fixed station with a quick and advantageous means of filling commonly used functions.

The RPT Switch 146 results in the display of the circled arrow 149 in display 12. The RPT Switch 147 results in the fixed station operating as a repeater station. The symbol and the operation of the radio in this mode indicates all incoming messages are being transmitted back out and provides advantages of allowing the fixed station to be unmanned.

Figure 4:
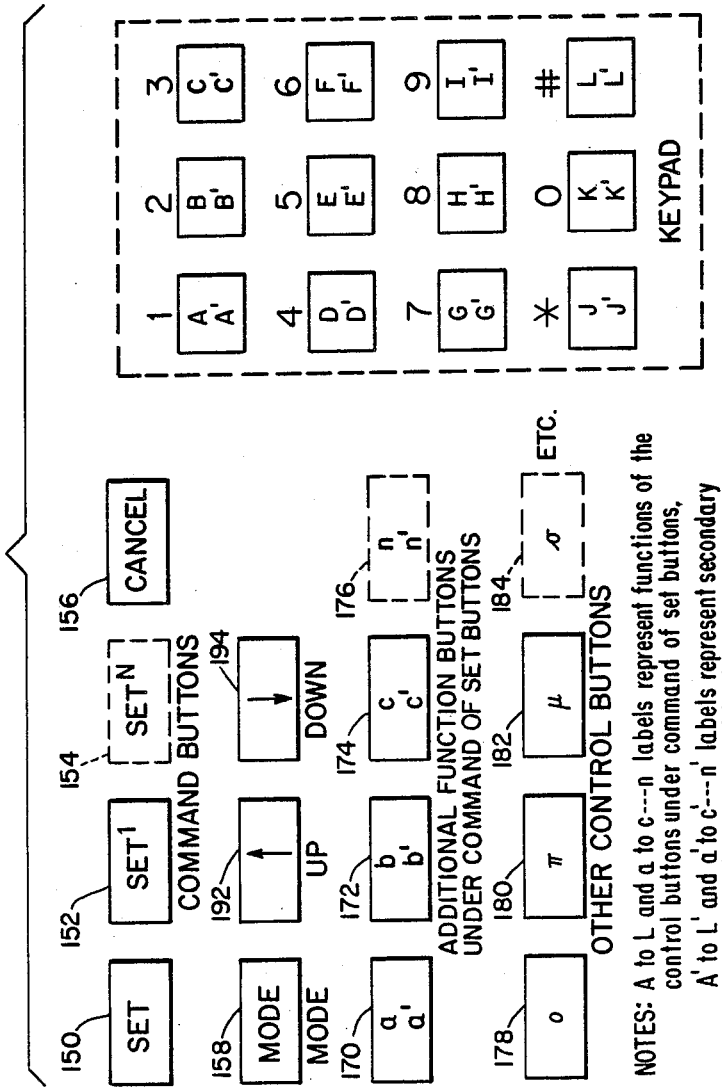
FIG. 4 is a schematic diagram illustrating the multifunctional keypad in combination with control switches and command switches to provide control capabilities in accordance with the invention.

Referring now to FIG. 4, the basic elements of the control system of the invention are illustrated in a schematic form. The keypad 14 includes a numerical presentation from 1 to 0 in a format similar to a telephone keypad with asterisk and pound symbols along with keypad switches bearing additional labels that may be displayed on or in the vicinity of the switch corresponding to the 1 to 0 and asterisk and pound positions on keypad 14. The labels on the switches correspond to the desired functions that are to be controlled. As shown in FIG. 4 one set of control switches are labeled A through L when activated by the SET command switch 150. A second set of control switches marked as A' through L' are accessed when activated by a SET' switch 152.

The keypad switches marked A through L and marked A' through L' access two different sets of control functions when accessed through either command SET switch 150 or command SET' switch 152. The SET' 152 switch can be duplicated in any number of sets as represented by the SET N switch 154 which allows switches A through L to provide additional functions in coordination with the SET N command switch. Command SET switches 150, 152 and 154, command CAN switch 156 and command MOD switch 158 represent the command switches. As heretofore indicated, the SET N represented by reference numeral 154 represents any number of additional command switches that can be added to the system to provide commands for prompting functions and reference numbers from the keypad switches. Each SET command switch can also be color coordinated with the functions related to it. The multiple function labels of the buttons can be provided on the button and its beveled sides or through labeled overlays.

The control up switch 192 and down switch 194 represents any number of paired control switches such as paired volume, channel and squelch switches such as volume switches 90-92, channel switches 44-46 and squelch switches 94 and 96 in FIG. 1. These control switches can also be integrated into a single rocker type switch as is well within the purview of those of ordinary skill in the art.

The control switches may be utilized for many functions as is represented by a, b, c etc. and a Prime, b Prime, c Prime etc. and n and m Prime. Thus a, b, c, n and a Prime, b Prime, c Prime and n Prime control switches have been referenced by reference numerals 170, 172 and 174 and 176 respectively. Additional function switches under the SET or other named command switches have also been labeled with Greek letters and are identified as switches 178, 180, 182 and 184 respectively.

As will be recognized, depending upon the particular design employed, the operator can either directly depress a switch to choose a function or press a suitably labeled command initiation switch such as SET switch 150 followed by the function switch in the keypad 14 or one of the additional function switches 170-184. The present system is designed so that command initiation switches such as a SET switch has to be depressed first before a function switch is selected and its respective value switch is depressed. In this way, orderly, disciplined protocols are achieved and inadvertent initiation of the functions is prevented. For the purposes of illustration, it is assumed that the SET switch 150 or subsequent SET switch 152 or 154 is utilized. A specific function is selected upon activating the particular SET switch followed by a function switch on the keypad 14 or one of various function switches represented by reference numerals 170 to 184. Next, the keypad 14 is utilized to set the value or position of the function selected. For example, pressing SET switch 150 followed by depressing of the A switch in keypad 14 followed by the depression of switch B and C will result in setting the function A and setting the value of function A at the value 23.

Microprocessor related software readily adapts itself to the control system of the invention. To further illustrate, it is assumed that function A might be labeled volume and that the communications equipment software is designed to provide 32 digital steps for volume control. Therefore, whenever the operator wishes to change the volume setting, for example to a step 23 value, he would first depress SET switch 150 followed by the volume function control switch, for example switch A, followed by switch B and switch C on keypad 14 to represent the value 23.

As a result, to select and set a position or value of any of the functions A through L on the keypad switches, the SET switch 150 is depressed followed by one of the function control switches A through L followed by a depression of switches corresponding to the numbers on the keypad representing the particular value. In order to set a function A Prime to L Prime the SET Prime switch 152 is depressed followed by one of the function switches on the keypad labeled A Prime through L Prime followed by a particular number value by depressing numbers corresponding to the number value on the keypad. Color coordinating the SET command switch with the functions it controls provides instant recognition of the relationship. Similarly the SET prime may be presented in a different color with all its corresponding functions color coordinated to indicate that relationship. When these functions are rearranged through software for specific requirements, label overlays or custom labeling schemes may be adopted for the switches. In addition, one of the command switches, say SET N, may be used to access alphabetical/symbol designations and functions for the keys to impart full alphabetic/alphanumeric capabilities, similar to the alphabetical/numeric combination labeling shown for the keypad in FIG. 4, except that the alphabetic characters beyond the letter L as shown on the keypad are assigned to the other switches outside the keypad.

The switches depressed on the keypad after the choice of a function may correspond to digital steps. The dialed numbers may also correspond to relative setting positions such as 1, 2, 3 respectively representing low, medium or high settings or for controlling any function in between depending upon the programming and variability provided in the software.

For simple on/off function, such as turning on a light, all that would be necessary would be to press the SET 150 switch followed by a function switch for the light as may be represented by one or more of the switches represented by reference numerals 170–184. In such simple on/off applications, turning the function off may be accomplished by using a negating command switch such as cancel switch 156 followed by the light control function switch which may be one of the switches designated in the set of switches 170–184. The software can also be designed so as to turn off the last function that was turned on or off whenever only the negating switch such as the cancel switch 156 is depressed.

As heretofore discussed, the command switches in combination with multifunctional control switches in the keypad and elsewhere are employed to impart tremendous versatility while at the same time significantly reducing the amount of required space by eliminating the multipositional knobs of the prior art.

In modern networks, it is becoming increasingly important to provide a means of communicating outside the organization's radio network and accessing the world-wide telephone network to where required and permissible. Also, using the many modern communications devices that are available for use over the public telephone system such as teleprinters, computer terminals, telex equipment, data equipment, facsimile terminals, slow scan TV, fingerprint encoders and other devices that operate on the world-wide phone network.

For example, a police officer whose equipment is limited to contacting entities within that organization's radio network is limited in his ability to access other organizations when required and permissible and also limited in making use of the modern devices that operate over the phone, such as facsimile terminals which may be used, for example, to transmit and receive composite sketches or photos of suspects.

The control system of the invention including the multifunctional control switches in the keypad and command switches provides so many combinations and capabilities that it can also be utilized to access the world-wide telephone network and any number of external communications devices. For example, the keypad can be used as a telephone dialing pad, as heretofore discussed, in which the police officer would press the SET switch 150 followed by the phone function switch which may be in keypad 14 or be one of the switches 170 to 184 which would then inform the microprocessor that a phone protocol is activated. At that point, the keypad would then become a dialing pad and the microprocessor could provide a dialing tone DTMF, while at the headquarters fixed station the protocols initiated would result in the establishment of a manual or automatic phone patch into the public telephone network. Similarly, the keypad could be used to dial many types of destination numbers in other types of networks while the SET switch 150, followed, for example, by a function switch such as AUX auxiliary switch 62 of FIG. 1 and followed by a dialed number could activate peripheral communications terminals and encoders/decoders that are connected to the radio and are patched into the network being accessed.

The keypad 14, control switches A to L and the other function switches as represented by 170 to 184 may be used for another combined capability, namely programming. After establishing the program mode, the keypad could be used to program the various attributes required. For example, depressing switch J twice which corresponds to the asterisk on keypad 14 could initiate the microprocessor/software to prompt the programming requirements such as displaying channel 1 operating frequency. At this point, the keypad could then be used to enter the desired frequency. After entering the frequency, switch J corresponding to the asterisk, as an example, may be pressed to inform the microprocessor that the required portion of programming (program module) is completed.

The microprocessor could alternatively have software that automatically recognizes that the required number of digits has been entered. At that point, the microprocessor would then prompt further programming. required by displaying a 'priority level' prompt. The keypad 14 may then be used to enter the priority level of the channel whose attributes are being programmed. After that, asterisk switch J on keypad 14 could be then used to prompt the next programming required, if any. Thereafter, the switch L corresponding to the pound switch could be depressed twice when the overall programming is completed. This would then instruct the microprocessor to shift from the program mode to another mode as defined in the software.

The keypad function control switches and other function control switches located on the transceiver are preferably used to provide a means for the operator to identify the various settings affected before altering the setting. Simply depressing the function switch on the keypad or a function switch located elsewhere on the radio corresponding to the function can order the microprocessor to indicate the function's current value setting. For example, if the squelch level is set to a level 23 setting, depressing an SQ or squelch switch B in keypad 14 (which would correspond to switch 56 in FIG. 1) would result in the display of the current value of the level 23 setting of the squelch without altering the squelch setting. In such an application, the command SET switch 150 or 52 in FIG. 1 is not used since no new setting is required and only verification of the last setting has been requested.

Simultaneously depressing a combination of control switches on the keypad and other function switches could be utilized to provide additional control functions. For example, pressing the pound and asterisk switches simultaneously could activate the backlighting system to all of the switches. Similarly, the touching of cancel switch 156 could be used to cancel the backlighting for the switches.

The multifunctional control switches located in keypad 14 and the other control switches can also be utilized for "Go-To" functions. For example, depressing SET switch 150 plus a function such as switch A on the keypad plus a number would choose the level of that function and, in accordance with software protocols, cause the microprocessor to prompt the requirements of setting another function relating to it. In a specific example, depressing the SET switch 150 followed by a tone function, followed by a dialed number to choose the tone required to access a specific radio repeater for example, could be used to cause the microprocessor to prompt the operator to choose a specific output power level by displaying "Power?". The user then will "Go-To" power function and press the SET switch followed by a switch for the power function, followed by the number representing the power level required.

The keypad switches and other control function switches can be utilized to derive other control facilities through multiple depressions of each of the individual control function or command switches. For example, pressing the SET switch 150 followed by a function switch such as switch A on keypad 14 can activate a desired function. If the same function switch A is pressed again within a predetermined period of time, another related or unrelated control function may be activated. If the switch is not depressed within the predetermined time, the next use of the switch will only activate the first function. As a result, the organization of the command and control switches and the multiple uses of the keypad control switches imparts significant versatility to microprocessor based two-way radios constructed in accordance with the invention while saving space and providing numerous advantages over the prior art.

Certain switches, for example, may be designed through software to produce no results until they are depressed for a predetermined period of time. This helps to prevent producing an undesirable operation through accidentally touching a switch such as the power switch. Additionally, pressing the function switch without first pressing the SET switch first will allow the operator to review the setting, value or status of that function without altering it.

Keypad switches and other control and command switches alone and in combination can also be used for invoking a request for verification of a critical control request which has been demanded. For example, pressing the cancel switch 156 twice within a half second could invoke a verification such as "default setting?" If the same key is pressed in the same manner, all settings of equipment would revert to a predetermined default setting. In this manner, the function of the switches in combination with control and command switches and the timed activation of the switches, provide a tremendous versatility in accessing particular types of information and result in the compact design of the novel control system.

The up/down control switches 190 and 192 in FIG. 4 correspond to the up/down switch combinations for volume 92-90 and up/down switches for channel switches 46-44 and up/down switch for squelch 96-94 in FIG. 1-3. The up/down switches can be used in conjunction with other control switches to set the status, value or relative value of the function selected. In this case, after the function is selected, its up/down position can be set through the use of the combined up/down switches. The up-down switches can also be used to move alphanumeric items or tables thereof, up or down or scrolled across the display. The response of the up/down keys, as with any other key, can be programmed for fast, slow, slewing or otherwise and the accessibility and characteristics of specific functions can be modified or restricted partially or totally.

FIGS. 6, 7, 8 and 9 relate to the preferred embodiment of the invention as shown in FIGS. 1 and 2. These figures describe circuitry that can be employed in conjunction with the control panel which, in describing the circuitry will be referred to as a Keyboard Control System. The Keyboard Control System (control panel is part of the Control Unit of a novel two-way land/mobile radio system that is described in detail in the co-pending application entitled Computerized Multistandard, Field-convertible, Multiregional/Multiservice, Remote Copntrollable, Remote Programmable Mobile Two-Way Radio System With Digital Serial Bus Link, Built-In Programmer and Autodiagnostics, the disclosure of which is incorporated herein by reference.

The description of FIGS. 6, 7, 8 and 9 will start with an overall description of the keyboard Control System including HARDWARE SUBASSEMBLIES, its FUNCTIONAL SCOPE and REFERENCES. In the text that follows, CU is an abbreviation for Control Unit, CPU refers to the Central Processing Unit and PCB refers to Printed Circuit Board.

HARDWARE SUBASSEMBLIES: The Keyboard Control System consists of four hardware subassemblies. These hardware subassemblies are identified as follows: the Front Panel Subassembly, the CU interconnect PCB subassembly, the CU CPU subassembly, and the CU memory PCB subassembly.

SCOPE-FUNCTIONAL: Functionally, the Keyboard Control System consist of 25 keys separated into two switch matrices. Matrix #1 is a 3ROWX 8 column switch Matrix. It is designed to accept keystrokes from the Command/Control/Function keys. Two adjacent simultaneous key depressions or three non-adjacent simultaneous key depressions are allowed with this design. Matrix #2 is a redundant 1ROWX 1 column switch Matrix. It is designed to accept keystrokes from the power on/off key.

REFERENCES: References used to design this keyboard structure are listed below.
 (1) Intel 8279 Programmable keyboard/display interface data sheet-1985
 (2) Motorola MC2671 Programmable keyboard and communications controller data sheet-1985

(3) RCA CPD1871A CMOS keyboard encoder data sheet-1985

(4) Texas Instruments TMS7000 keyboard interface manual-1985

Referring now to FIG. 6, the Keyboard Control System starts with the Front Panel Subassembly. This drawing represents the start of the man-machine interface. As stated earlier there are two switch matrices. SI-S6, S9-S26 made up Matrix #1. Matrix #2 consists of switches S7 and S8 in a redundant 1 row x 1 column configuration. The two switch matrices are made up mechanically by mating a conductive silicon rubber keypad to a PC board that has the switch matrices printed on it as illustrated in DWG. No. 092201-00012. A key depression occurs when a silicon rubber key boot makes contact with the PC board, thus providing an electrical path from a unique row to a unique column. The silicon rubber keypad, with injection molded plastic keycaps installed, is enclosed in an injection molded plastic front panel. This total composition makes up the Front Panel Subassembly. Silicon rubber keypad vendors include: conductive rubber technology and Shin Itsu Polymer. Injection molded plastic vendors include: Eeco and Durilith.

Figure 7A:
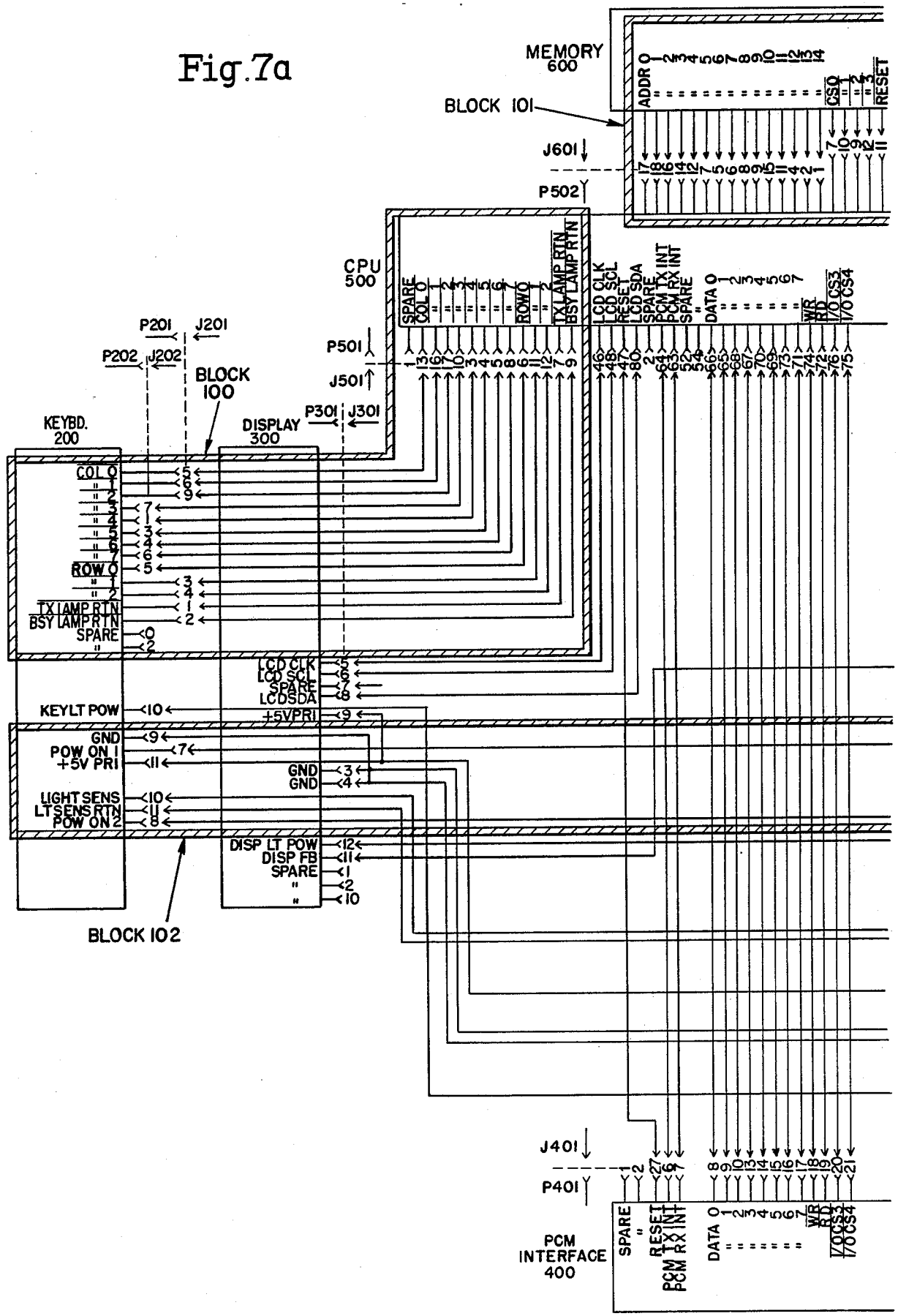
FIG. 7 illustrates the Control Unit Interconnect Printed Circuit Board Subassembly related to the keyboard control system (control panel)
Figure 7B:
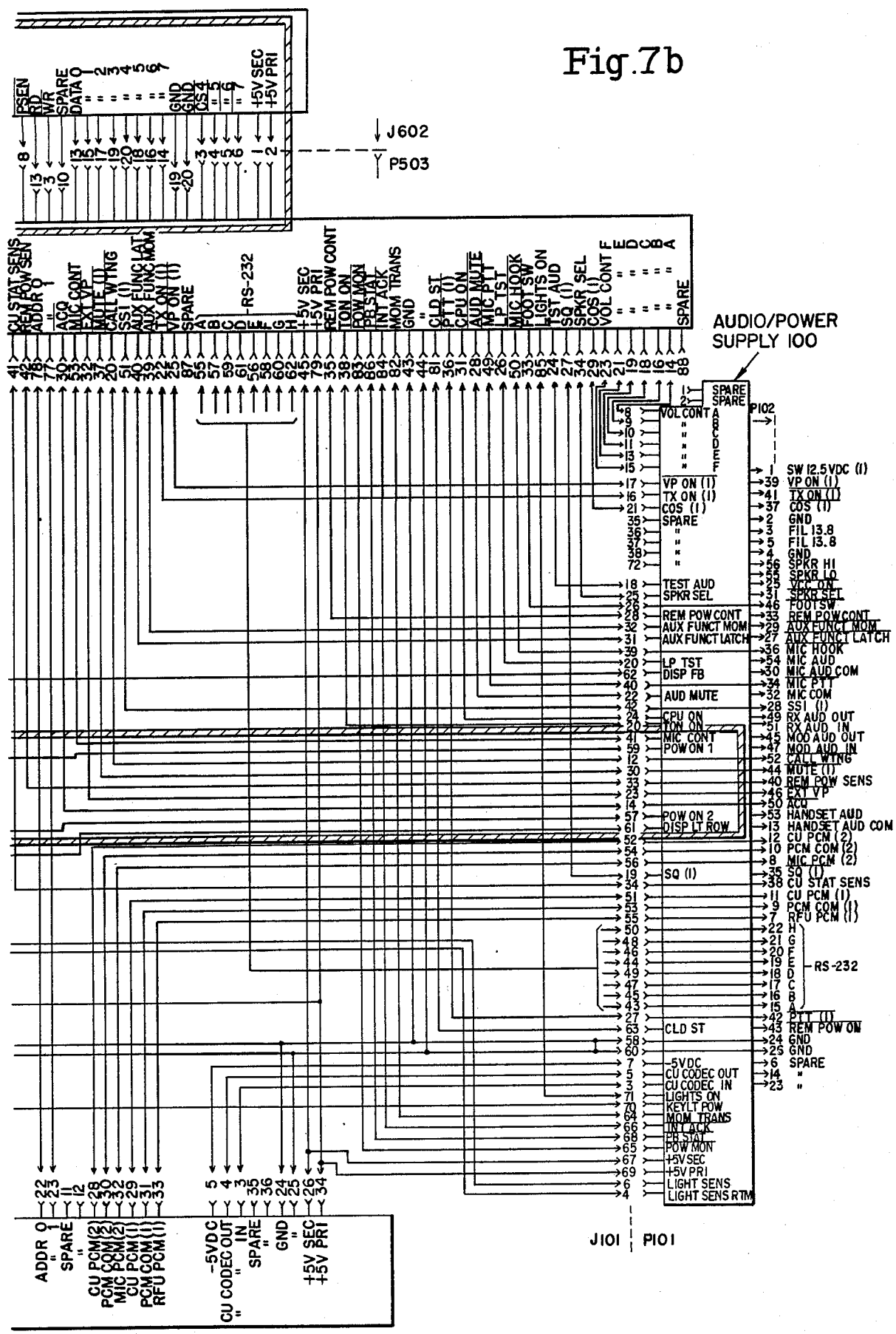

FIG. 7 illustrates the second part of the Keyboard Control System: the Control Interconnect PCB Subassembly. It is a PC board that routes the electrical conductors to/from the front panel subassembly and the CU CPU subassembly.

The third part of the Keyboard Control System which is the CU CPU Subassembly. This hardware subassembly provides the electronics to allow the software to monitor the front panel assembly to detect key depressions and to allow the software to perform some required action based on those key depressions. A full description of the system software related to the microprocessors and programming of the Control Unit and Transceiver Unit of the novel mobile radio system that employs the control panel of the invention is provided in the copending application entitled: Computerized Multistandard, Field-Convertible, Multiregional/Multiservice, Remote Controllable, Remote Programmable Mobile Two-Way Radio System With Digital Serial Bus Link, Built-In Programmer And Autodiagnostics which disclosure is incorporated herein by reference.

Figure 8A:
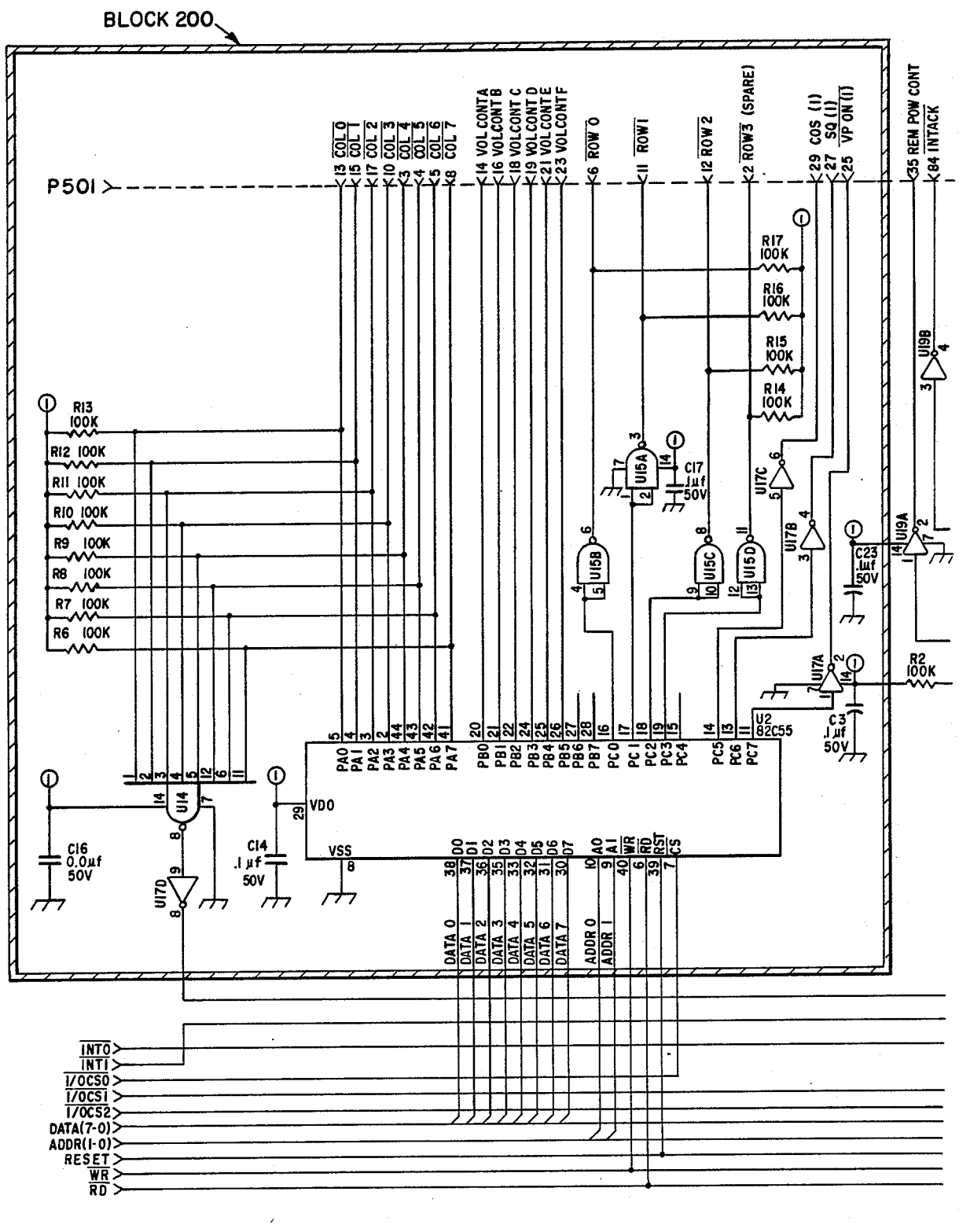
FIG. 8 illustrates the Control Unit—Central Processing Unit Subassembly related to the keyboard control system (control panel)
Figure 8B:
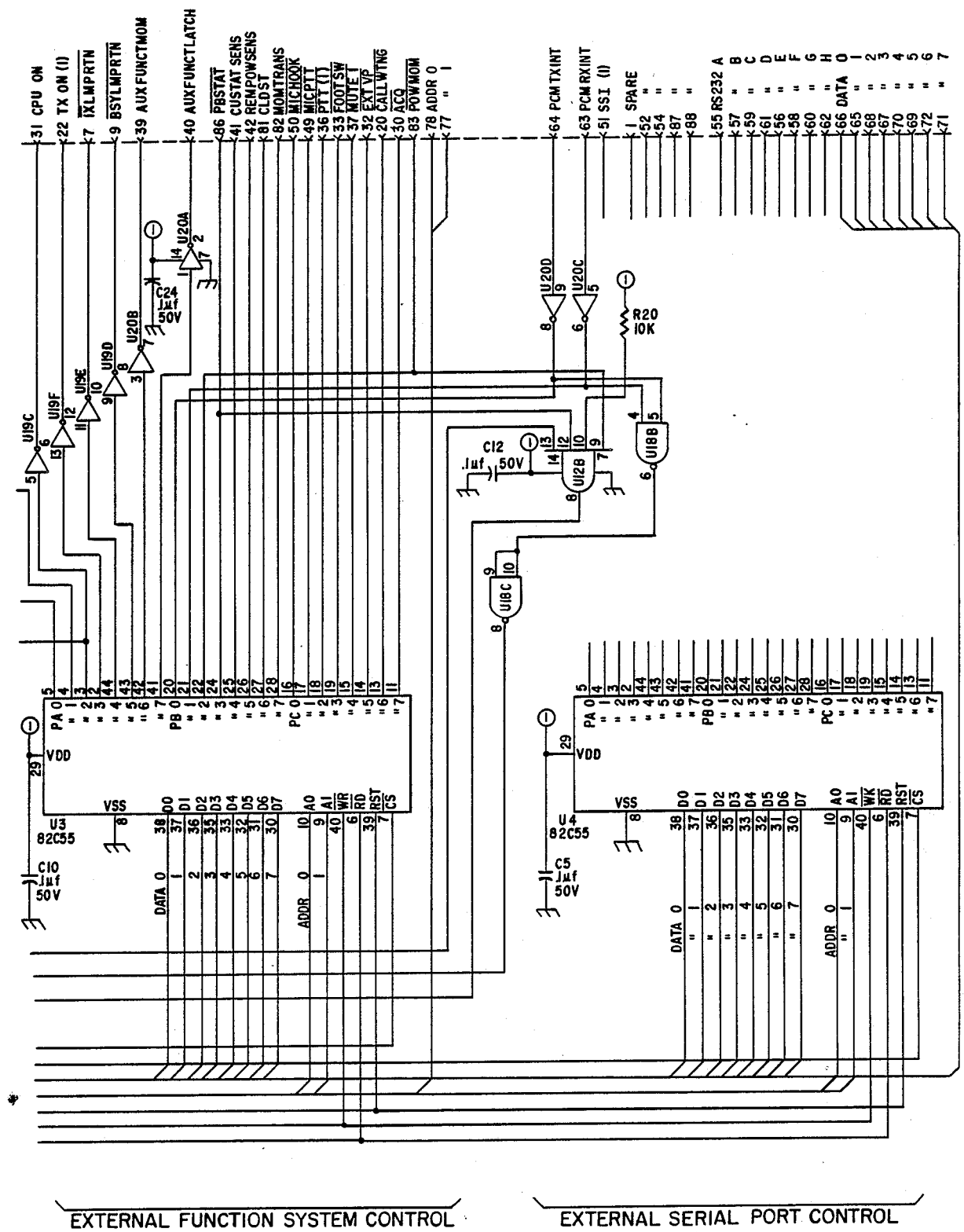
Figure 9A:
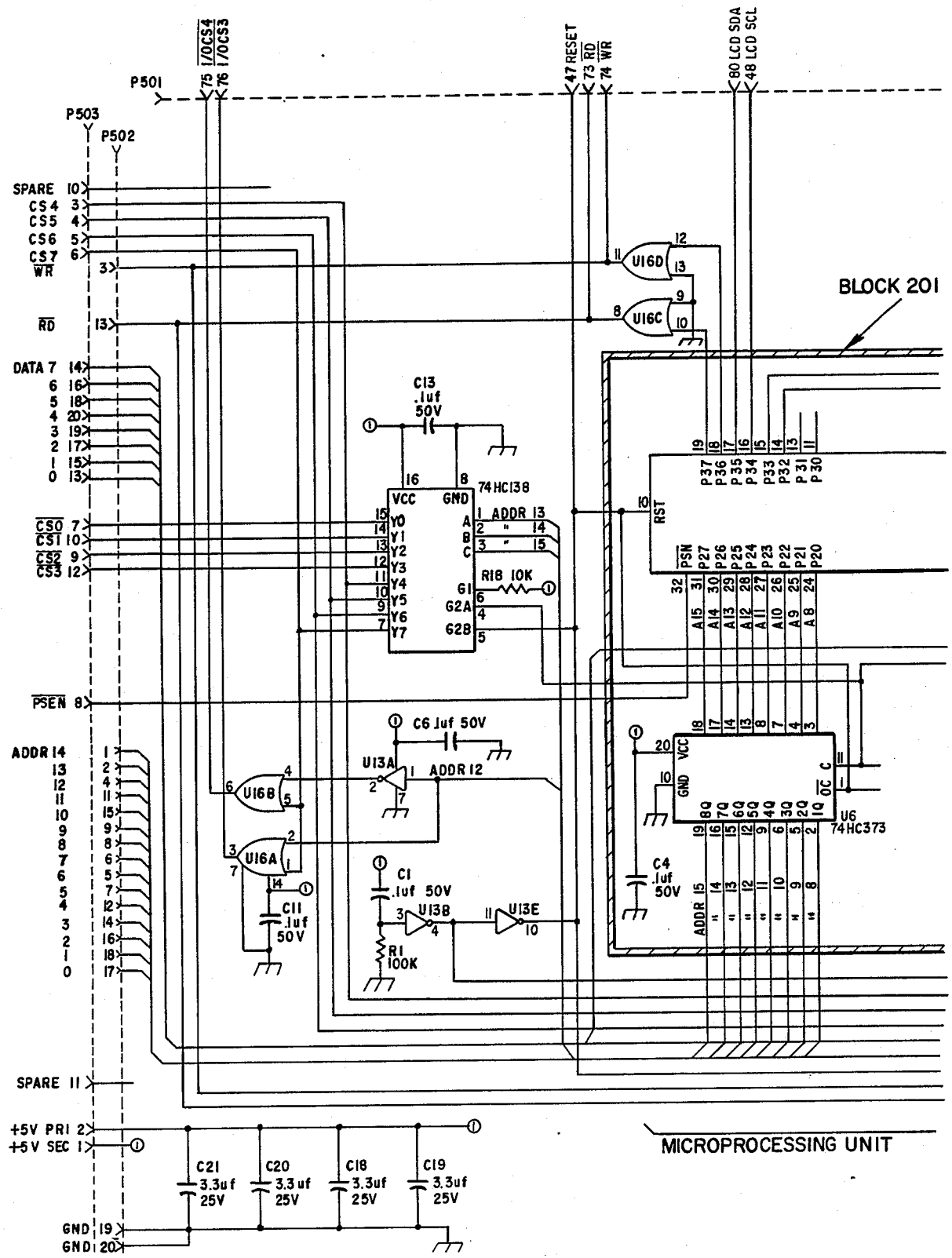
FIG. 9 illustrates the Control Unit—Central Processing Unit Subassembly related to the keyboard control system (control panel)
Figure 9B:
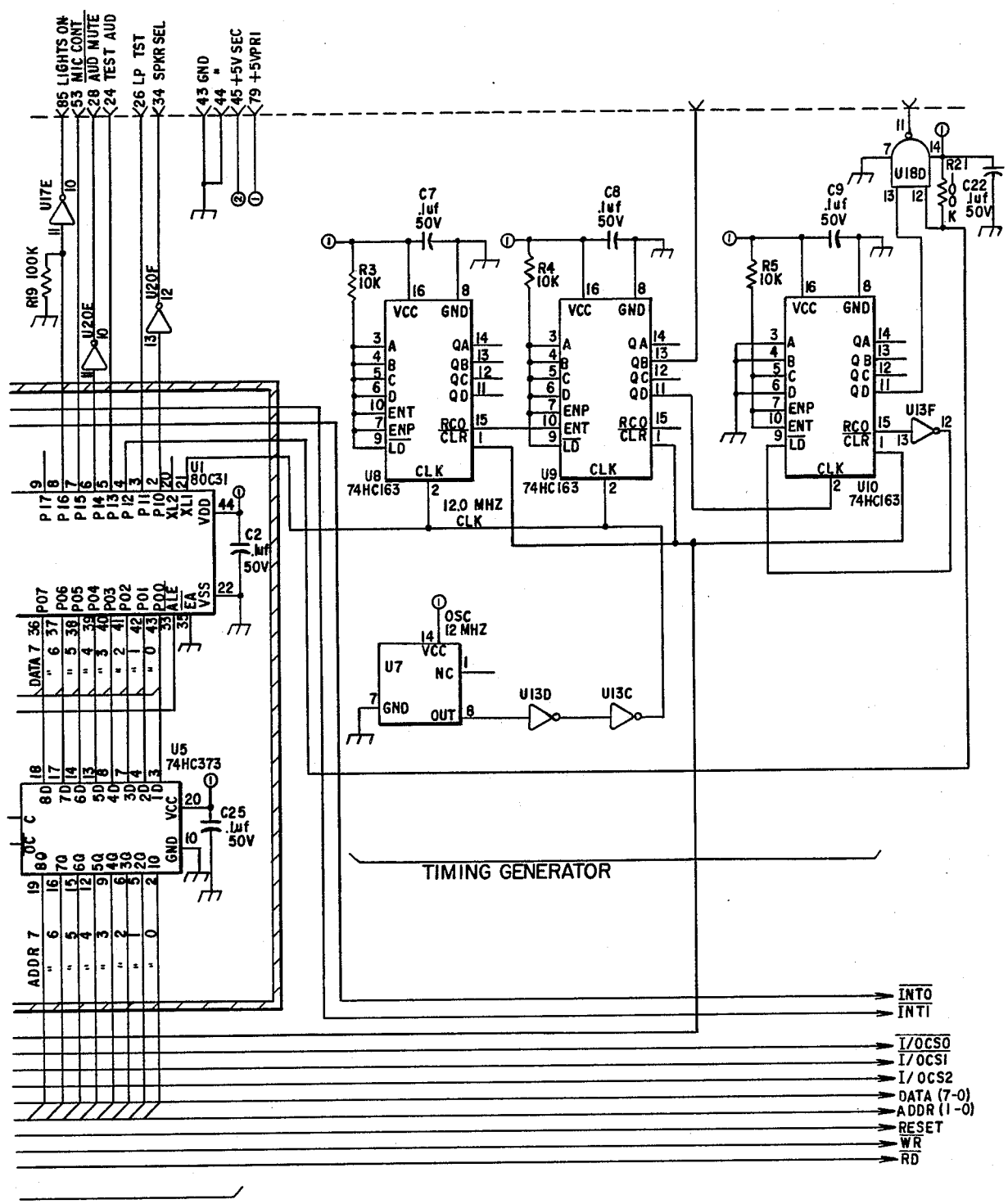

The Front Panel Subassembly Interface is illustrated by Block 200 in FIG. 8. The CU CPU is illustrated by Block 201. The CU CPU consists of the 80C31 Microcontroller (UI) made by Intel and OKI and two 74HC373 address latches (U5,6) made by Motorola and Signetics. The CU CPU monitors the Front Panel Subassembly for key depressions via the CU CPU Interrrupt Line "Into". A key depression will result in the signal line "Into" going to a logic "o" level for the duration of the key depression.

The CU CPU interrogates the Front Panel Subassembly further by writing row information and reading column information to/from the 82C55 port (U2) located at Block 200 of FIG. 8. This port is made by Intel and OKI. By writing a logic "o" level onto each row signal sequentially and reading the column signals each time, the CU CPU can identify the row-column address of the key that is depressed. This process is commonly referred to as "scanning the keyboard". The row-column address is compared to a list of valid Row-Column addresses located in software tables to determine if the key depression is valid. Details and examples of software keyboard control are described in the copending application entitled Computerized Multistandard, Field-Convertible, Multiregional/Multiservice, Remote Controllable, Remote Programmable Mobile Two-Way Radio System With Digital Serial Bus Link, Built-In Programmer and Autodiagnostics, which disclosure is incorporated by reference.

The 74HC03 open drain "nand" gate drivers (U15A-C) are provided on the row lines to allow simultaneous key depressions involving more than one row these. Such devices are made by and available from Motorola and Signetics. Pull-up resistors R15-R17 are used to assist automated test equipment in testing the PC board by providing logic "1" levels on the row lines when the drivers (U15A-C) are switched off. Pull-up resistors RG-R13 are provided on the column lines to hold them to a logic "1" level when there is no key depressions. A "nand" gate (U14) 74HC30 and an "Inverter" 74HC04 (U17D) are used to generate the key depression interrupt that ultimately goes to the CU CPU as the signal "Into".

Figure 10A:
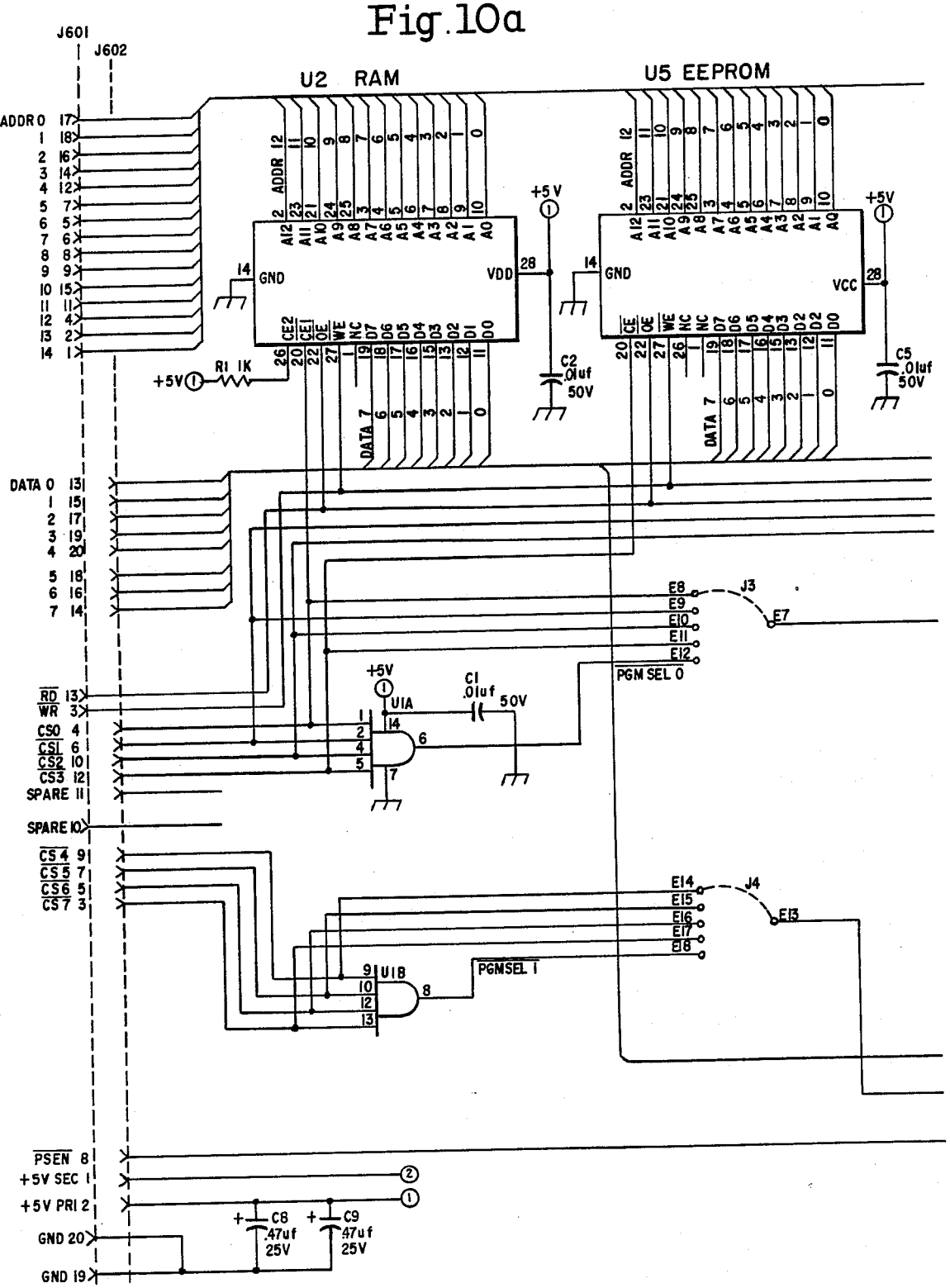
FIG. 10 illustrates the Control Unit—Memory Unit Subassembly.
Figure 10B:
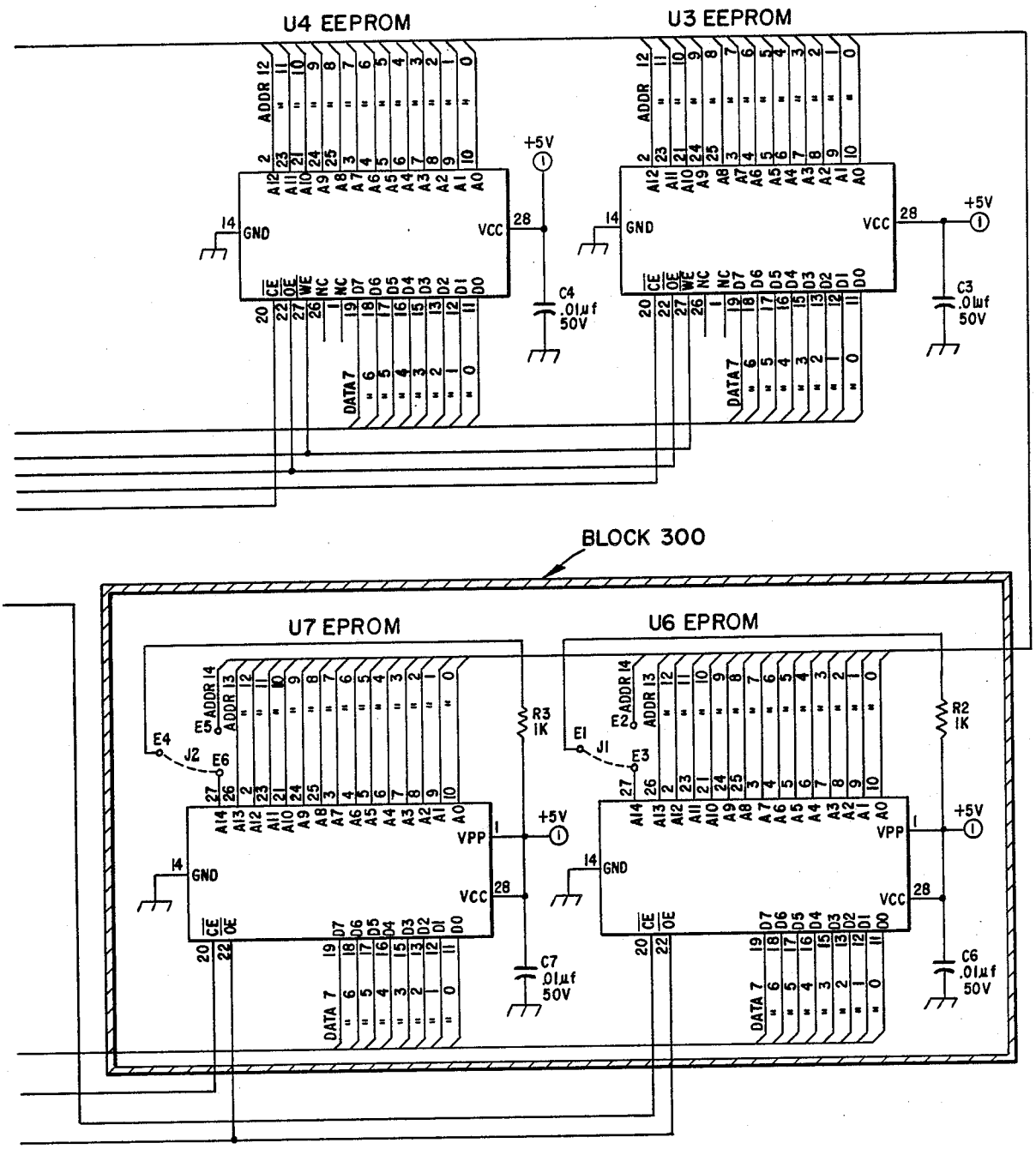

The fourth part of the Keyboard Control System is the CU Memory PCB Subassembly. It is a PC board that houses the software used to drive the CPU. The software is located in the eproms (U6,7) illustrated in Block 300 of FIG. 10. These eproms are made by and available from Hitachi, Nec, Intel and others. The software instructions are retrieved by the CPU over the address/data bus )reference Block 101 of FIG. 7).

The final part of the Keyboard Control System is Matrix #2. These conductors are routed to the CU audio/PS PCB subassembly where the front panel momentary switch is converted to a SPDT toggle type switch to turn power on/off. (reference Block 102 of FIG. 7).

Those skilled in the art will recognize that the present invention, in replacing the prior art multipositional switches and knobs, has resulted in a unique control system. The present system provides tremendous versatility and capabilities in providing for the accommodation of a new and a large number and variety of control capabilities in a very compact, consistent, user-friendly and practical form. The system of the invention uses a common keypad in many different ways and combinations with the other switches to provide a single two-way radio that can replace many different single function radios. Thus, the present control system of the invention can be advantageously utilized to derive a vast number of varied control capabilities in a simple, cost effective and advantageous manner for an entire new generation of communication equipment using a software based system.

The reference in this application to the word buttons or switches and keypad or keyboard should not be limited to traditional keypads in that other control initiating means and devices including but not limited to external switches, external signals essentially simulating the action of switches, touch sensors, rocker switches, membrane switches, heat sensors and proximity sensors may be used alone or in conjunction with the depressible switches discussed int he detailed description of the invention.

The control system of the invention can be advantageously employed in part or completely in other equipment in the communications and electronic field, such as, but not limited to telemetry equipment, remote extended control systems and security systems without departing from the spirit or scope of the present control system. As will be recognized by those skilled in the art, the invention has a wide range of applicability to communications systems and may be utilized in a variety of ways to increase the control and access of information networks and data centers while reducing the number of control inputs in the form of conventional multicontact switches, dials and other bulky and space consuming control devices.

Furthermore, the control system of the invention, due to its versatility and compactness, can be advantageously employed in production by the manufacture of a limited number of standardized models with the programming inexpensively changed by the application of software rather than hardware surrounding the radio. Part or all of the control system can be assigned entirely new or additional or partially changed control tasks through programming changes without requiring a new hardware design. Only labeling changes may be required which can be accomplished by merely changing label templates. For example, one of the labeling schemes contemplated in accordance with the invention is the assignment of alphabetic/symbol characters to the switches which are accessed through a related SET switch or during programming mode to impart full alphabetic/alphanumeric capabilities similar to a typewriter keyboard. Thus, the versatility of the invention is achieved by the novel combination of command switches and combined control and value switches with software and the accommodation of labeling flexibility to further reduce the size and complexity of the system for accessing, controlling, storing and entering information. It will further be appreciated by those skilled in the art that the invention is susceptible to various modifications which can be made within the spirit and scope of the invention and are to be considered as included in the following claims.

What is claimed is:

1. A control system for land based and mobile radio communications equipment comprising:
    (a) a face control panel having a display portion, a command portion and a keypad portion, said keypad portion having keypad values from '1' to '0';
    (b) a plurality of keypad control buttons or switches activated by heat, light, pressure or a combination thereof disposed in said keypad portion of said face control panel corresponding to said keypad values from '1' to '0' and at least one of said control buttons or switches having a control function, said control buttons or switches having control functions when in a control mode and value functions which correspond to said keypad values when in a value mode;
    (c) a command button or switch activated by heat, light, pressure or a combination thereof disposed in said command portion of said face control panel for accessing said control functions provided by said keypad control buttons or switches and for then changing values or stati of a selected control function by allowing the access of said function to said keypad in a value mode;
    (d) an alphanumeric display, said display being programmably operable in either a wraparound or scrolling fashion and disposed in said display portion of said face control panel to display symbols and alphanumeric characters to represent a selected operating mode and confirmation of other operating or programming related information and numbers to represent stati and information related to operation and programming; and
    (e) software for accessing and subsequent resetting of the values or stati of said keypad control buttons or switches, said command button or switch and said alphanumeric display.

2. The control system of claim 1 further comprising a pound '#' and asterisk '*' symbol in said keypad portion arranged with said keypad control buttons or switches having values to form a telephone type keypad along with additional control buttons or switches activated by heat, light, pressure or a combination thereof corresponding to said pound '#' and asterisk '*' symbols on said keypad portion.

3. The control system of claim 1 further comprising a second control panel with additional control buttons or switches activated by heat, light, pressure or a combination thereof disposed outside said keypad portion of said face control panel.

4. The control system of claim 1 further comprising a third control panel disposed adjacent to said display.

5. The control system of claim 4 further comprising paired up ' ↑ ' and down ' ↓ ' control buttons or switches activated by heat, light, pressure or a combination thereof for controlling channel selection.

6. The control system of claim 4 further comprising paired up ' ↑ ' and down ' ↓ ' control buttons or switches activated by heat, light, pressure or a combination thereof for controlling volume.

7. The control system of claim 4 further comprising paired up ' ↑ ' and down ' ↓ ' control buttons or switches activated by heated, light, pressure or a combination thereof for controlling squelch level.

8. The control system of claim 1 further comprising a plurality of command buttons or switches activated by heat, light, pressure or a combination thereof.

9. The control system of claim 8 wherein one of said command buttons or switches is a SET button or switch that is utilized for selecting or entering a function to be controlled.

10. The control system of claim 8 wherein one of said command buttons or switches includes a mode button or switch activated by heat, light, pressure or a combination thereof.

11. The control system of claim 10 wherein said plurality of command buttons or switches includes secondary SET buttons or switches activated by heat, light, pressure or a combination thereof utilized for selecting or entering secondary functions to be controlled.

12. The control system of claim 10 wherein said mode button or switch cycles the operating modes from manual, channel selection to manual with priority, scan, priority scan, voting and back to manual.

13. The control system of claim 8 wherein one of said command buttons or switches includes a cancel button or switch activated by heat, light, pressure or a combination thereof.

14. The control system of claim 8 wherein each of said keypad control buttons or switches in said keypad bear a plurality of control identifications including a plurality of control functions in which a particular control function is accessed through a corresponding SET button or switch activated by heat, light, pressure or a combination thereof.

15. The control system of claim 1 wherein the activation of a combination of control buttons or switches shifts the radio communication equipment into a special operating or programming mode.

16. The control system of claim 1 wherein on/off functions are controlled by activating a combination of control buttons or switches in a predetermined order.

17. The control system of claim 1 further comprising a second display for indicating transmit status.

18. The control system of claim 1 further comprising a third display for indicating a channel busy status.

19. The control system of claim 1 wherein said combination of command and control buttons or switches and display are used to prompt and program the radio communications equipment.

20. The control system of claim 1 wherein certain control buttons or switches are activated only after they have been depressed in a particular sequence or for a particular period of time.

21. The control system of claim 1 further comprising an ambient light sensor to programmably increase or decrease panel or background lighting.

22. A control system for radio communications equipment comprising:
(a) a control panel having a display portion, a command portion, a multifunctional keypad control portion and an additional control button or switch portion;
(b) at least ten multifunctional control buttons or switches activated by heat, light, pressure or a combination thereof having values or control modes displayed thereon said multifunctional control buttons or switches disposed in said multifunctional keypad control portion of said control panel with each of said multifunctional buttons or switches having both a function control mode and value mode;
(c) a command button or switch activated by heat, light, pressure or a combination thereof disposed in said command portion of said control panel;
(d) a display disposed in said display portion of said control panel for displaying symbols, analog level and alphanumeric characters representing the selected operating mode; and
(e) software for accessing, operating and programming numbers or symbols representing values or stati of said keypad control buttons or switches said command button or switch and said display.

23. The control system of claim 22 wherein each multifunctional control button or switch on said keypad control portion includes function control mode information and the area surrounding each button or switch on said keypad control portion includes value information.

24. The control system of claim 22 wherein each multifunctional control button or switch on said keypad control portion displays value information and the area surrounding each button or switch on said keypad includes control mode information.

25. The control system of claim 22 further comprising additional control buttons or switches activated by heat, light, pressure or a combination thereof disposed outside of said keypad control portion of said control panel.

26. The control system of claim 25 further comprising paired up '↑' and down '↓' control buttons or switches activated by heat, light, pressure or a combination thereof.

27. The control system of claim 26 wherein said set of paired up '↑' and down '↓' control buttons or switches control channel selection with a corresponding group and channel alphanumeric display.

28. The control system of claim 26 further comprising a set of paired up '↑' and down '↓' control buttons or switches activated by heat, light, pressure or a combination thereof for controlling volume with a corresponding analog level and alphanumeric display.

29. The control system of claim 26 further comprising a set of paired up '↑' and down '↓' control buttons or switches activated by heat, light, pressure or a combination thereof for controlling squelch level with an analog level and alphanumeric display.

30. The control system of claim 22 further comprising a plurality of command buttons or switches activated by heat, light, pressure or a combination thereof.

31. The control system of claim 22 wherein said plurality of command buttons or switches include at least one SET button or switch activated by heat, light, pressure or a combination thereof and a mode button or switch activated by heat, light, pressure or a combination thereof.

32. A control system for communications equipment comprising:
(a) a compact control and display panel including a command portion, a control portion, a display portion and a keypad portion said keypad portion having values from '1' to '0' and a pound '#' and asterisk '*' symbol to form a telephone type keypad;
(b) a plurality of multifunctional keypad control buttons or switches activated by heat, light, pressure or a combination thereof disposed in said keypad portion of said control and display panel said control buttons or switches having control functions when in a control mode and value functions from '1' to '0' when in a value mode;
(c) a command button or switch activated by heat, light, pressure or a combination thereof disposed in said command portion of said panel for accessing control functions of said multifunctional keypad control buttons or switches;
(d) a display disposed in said display portion of said panel for displaying selected control functions associated with the control mode function and values for selected or retrieved values and functions; and
(e) software for accessing and setting values or stati of said plurality of multifunctional keypad control buttons or switches or said command button or switch.

33. The control system for communications equipment of claim 32 further comprising additional control buttons or switches activated by heat, light, pressure or a combination thereof disposed outside of said keypad portion of said compact control and display panel.

34. The control system for communications equipment of claim 33 further comprising paired up '↑' and down '↓' control buttons or switches activated by heat, light, pressure or a combination thereof.

35. The control system for communications equipment of claim 34 wherein said paired buttons or switches provide slewed action.

36. The control system for communications equipment of claim 32 wherein said command button or switch is a set button or switch for accessing one or more control buttons or switches.

37. The control system for communications equipment of claim 36 further comprising a second command button or switch activated by heat, light, pressure or a combination thereof wherein said second command button or switch is a mode button or switch for cycling modes from manual channel select to manual with priority to scan to priority scan and back to manual mode.

38. The control system for communications equipment of claim 37 wherein said control buttons or switches and said command buttons or switches alone or in combination provide for the selection of functions including functions such as channel group selection, the selection of status and value of the functions 'on-off' latching requirements, dialing telephone numbers, programming verifying settings, function to function referral 'go-to', for cancelling or reverting a function set or requesting access, identification or other codes or other functions provided by software.

39. A method of operating and controlling a two-way radio comprising the steps of:
(a) utilizing a plurality of multifunctional keypad control buttons or switches activated by heat, light, pressure or a combination thereof having a value mode and a function control mode;
(b) providing at least one command button or switch activated by heat, light, pressure or a combination thereof;
(c) providing a microprocessor and digital control circuitry for said keypad control buttons or switches and said command button or switch;
(d) utilizing software in combination with said microprocessor and said digital control circuitry to access a plurality of control, operating and programming protocols and to make changes in said protocols; and
(e) providing a display to identify the value mode and function mode accessed by said software.

40. The method of operating and controlling a two-way radio of claim 39 wherein said combination of multifunctional keypad control buttons or switches, said command button or switch and said display alone or in combination are repeatedly employed for said protocols including selecting functions, setting the status of the function, on/off latching requirements, dialing telephone or destination numbers, programming, verifying settings, modifying other control functions through button or switch combinations, function to function referral ("go-to"), involving cycling of different responses when a control or command button or switch is given successive depressions within a predetermined period of time, providing a response after a command or control button or switch is depressed for a predetermined period of time, providing momentary nonlatching on/off controls, invoking a critical operation after a control or command button or switch is pressed twice or more times in a predetermined manner which would then produce a request for ascertaining the requested critical control and provide a critical response after depressing a control or command button or switch in a predetermined manner, cancelling or reverting a function set, requesting access identification or other codes and varying operating modes in succession or cycle.

* * * * *